United States Patent
Nakamura

(10) Patent No.: US 8,305,644 B2
(45) Date of Patent: Nov. 6, 2012

(54) IMAGE FORMING DEVICE, IMAGE FORMING METHOD, AND RECORDING MEDIUM

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 534 days.

(21) Appl. No.: 12/260,287

(22) Filed: Oct. 29, 2008

(65) Prior Publication Data

US 2009/0116073 A1    May 7, 2009

(30) Foreign Application Priority Data

Oct. 31, 2007 (JP) ................................. 2007-283547

(51) Int. Cl.
- *H04N 1/40* (2006.01)
- *H04N 1/60* (2006.01)
- *H04N 1/21* (2006.01)
- *G03F 3/08* (2006.01)
- *G03G 15/00* (2006.01)
- *G03G 15/10* (2006.01)
- *G06K 9/00* (2006.01)
- *G06F 3/12* (2006.01)

(52) U.S. Cl. ....... 358/3.23; 358/3.04; 358/518; 358/1.9; 358/296; 358/1.15; 399/8; 399/62; 382/165

(58) Field of Classification Search ................. 358/3.23, 358/3.04, 1.9, 296, 518; 399/8, 62; 382/165
See application file for complete search history.

(56) References Cited

U.S. PATENT DOCUMENTS

| | | | | |
|---|---|---|---|---|
| 5,636,032 A | * | 6/1997 | Springett | 358/296 |
| 6,160,968 A | * | 12/2000 | Noda | 399/8 |
| 6,480,624 B1 | * | 11/2002 | Horie et al. | 382/165 |
| 7,626,741 B2 | * | 12/2009 | Yamada | 358/518 |
| 7,760,398 B2 | * | 7/2010 | Kawai | 358/1.9 |
| 7,826,096 B2 | * | 11/2010 | Chiwata | 358/3.04 |
| 2008/0205923 A1 | * | 8/2008 | Takeuchi et al. | 399/62 |

FOREIGN PATENT DOCUMENTS

| | | |
|---|---|---|
| JP | 05-338269 A | 12/1993 |
| JP | 2001-281939 A | 10/2001 |

* cited by examiner

*Primary Examiner* — Charlotte M Baker
*Assistant Examiner* — Rury Grisham
(74) *Attorney, Agent, or Firm* — Canon U.S.A., Inc., IP Division

(57) ABSTRACT

Density-correction-table lists showing an amount of density changes in respective density levels of images that exist after an image having a predetermined density has been printed on a predetermined number of sheets are maintained. The amount of density changes in the respective density levels for an image ratio that exists after the predetermined number of sheets have been printed on and for the predetermined number of sheets that have been printed on are obtained with reference to values in the maintained density-correction-table lists. A density correction characteristic is determined using the obtained amount of density changes.

14 Claims, 17 Drawing Sheets

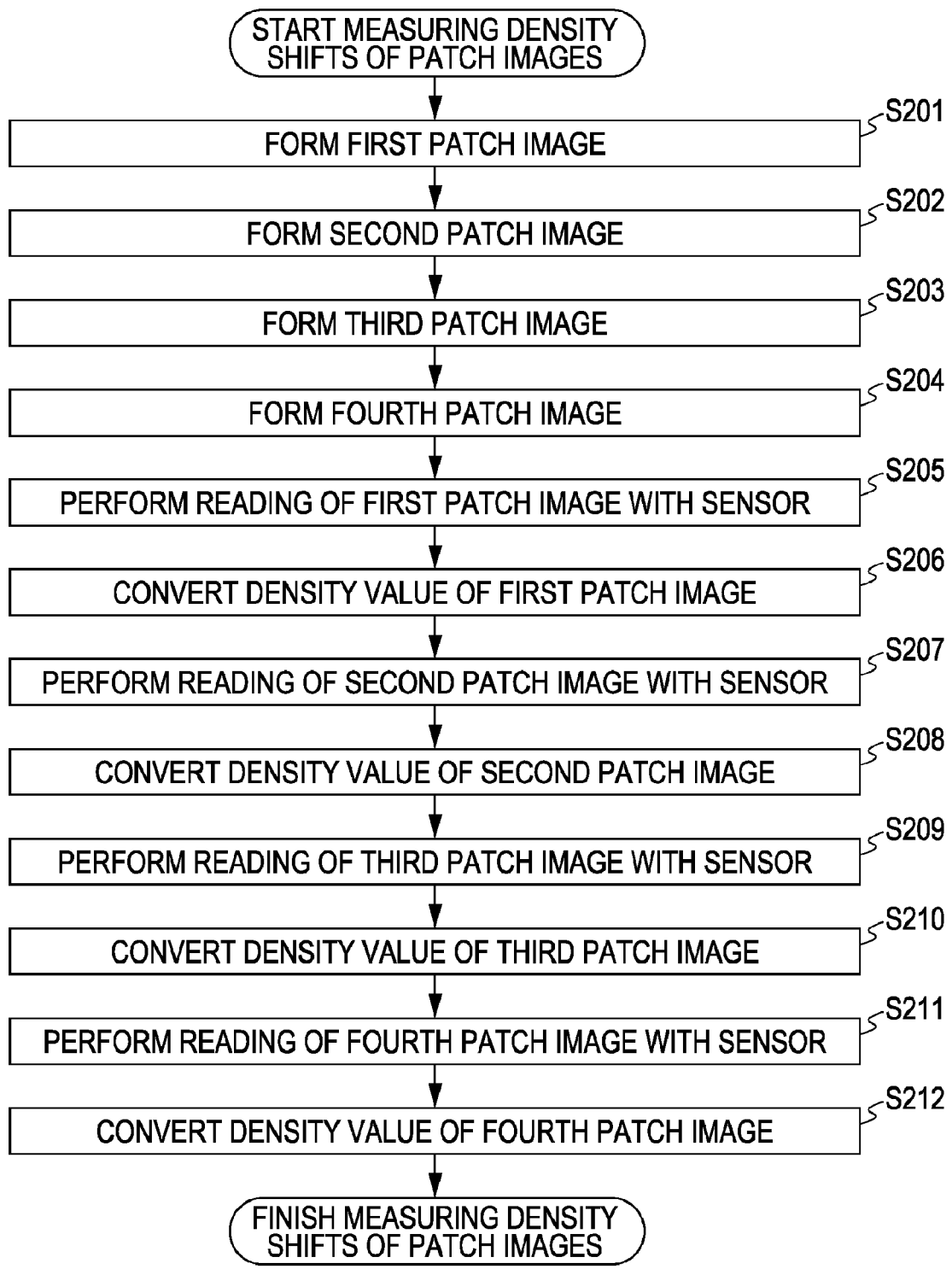

FIG. 3B

FOR PATCH-IMAGE DENSITY LEVEL OF 64

IMAGE RATIO

| PAPER COUNTER VALUE | 20% | 40% | 60% | 80% | 100% |
|---|---|---|---|---|---|
| 400 SHEETS | E(1)(a) | D(1)(a) | C(1)(a) | B(1)(a) | A(1)(a) |
| 800 SHEETS | E(2)(a) | D(2)(a) | C(2)(a) | B(2)(a) | A(2)(a) |
| 1200 SHEETS | E(3)(a) | D(3)(a) | C(3)(a) | B(3)(a) | A(3)(a) |
| 1600 SHEETS | E(4)(a) | D(4)(a) | C(4)(a) | B(4)(a) | A(4)(a) |
| 2000 SHEETS | E(5)(a) | D(5)(a) | C(5)(a) | B(5)(a) | A(5)(a) |

FOR PATCH-IMAGE DENSITY LEVEL OF 128
FOR PATCH-IMAGE DENSITY LEVEL OF 192
FOR PATCH-IMAGE DENSITY LEVEL OF 255

FIG. 3C

FOR PATCH-IMAGE DENSITY LEVEL OF 64

IMAGE RATIO

| PAPER COUNTER VALUE | 20% | 40% | 60% | 80% | 100% |
|---|---|---|---|---|---|
| 400 SHEETS | 0.61 | 0.66 | 0.68 | 0.80 | 0.85 |
| 800 SHEETS | 0.62 | 0.71 | 0.72 | 0.85 | 0.88 |
| 1200 SHEETS | 0.654 | 0.74 | 0.76 | 0.88 | 0.92 |
| 1600 SHEETS | 0.68 | 0.77 | 0.81 | 0.90 | 0.95 |
| 2000 SHEETS | 0.71 | 0.78 | 0.85 | 0.92 | 1.00 |

FOR PATCH-IMAGE DENSITY LEVEL OF 128
FOR PATCH-IMAGE DENSITY LEVEL OF 192
FOR PATCH-IMAGE DENSITY LEVEL OF 255

FIG. 3D

FOR PATCH-IMAGE DENSITY LEVEL OF 64

IMAGE RATIO

| PAPER COUNTER VALUE | 20% | 40% | 60% | 80% | 100% |
|---|---|---|---|---|---|
| 400 SHEETS | 1.00 | 1.08 | 1.11 | 1.31 | 1.39 |
| 800 SHEETS | 1.01 | 1.16 | 1.18 | 1.39 | 1.44 |
| 1200 SHEETS | 1.06 | 1.21 | 1.25 | 1.44 | 1.51 |
| 1600 SHEETS | 1.00 | 1.26 | 1.33 | 1.48 | 1.56 |
| 2000 SHEETS | 1.16 | 1.28 | 1.39 | 1.51 | 1.64 |

FOR PATCH-IMAGE DENSITY LEVEL OF 128
FOR PATCH-IMAGE DENSITY LEVEL OF 192
FOR PATCH-IMAGE DENSITY LEVEL OF 255

FIG. 5

PATCH-IMAGE DENSITY LEVEL: 64

IMAGE RATIO

| NUMBER OF SHEETS THAT HAVE BEEN PRINTED ON | 20% | 40% | |
|---|---|---|---|
| 400 SHEETS | 10 | 25 | |
| 800 SHEETS | 16 | 30 | |
| 1200 SHEETS | 18 | 38 | |
| | | | |

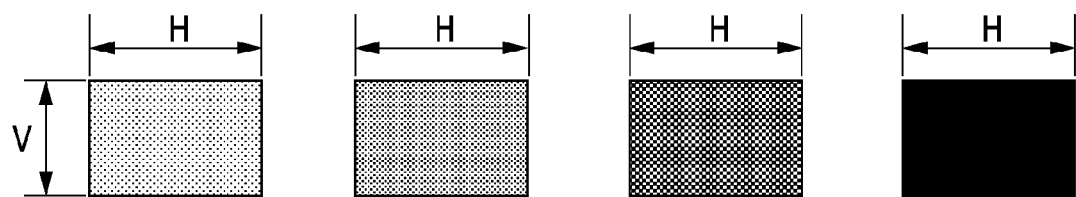
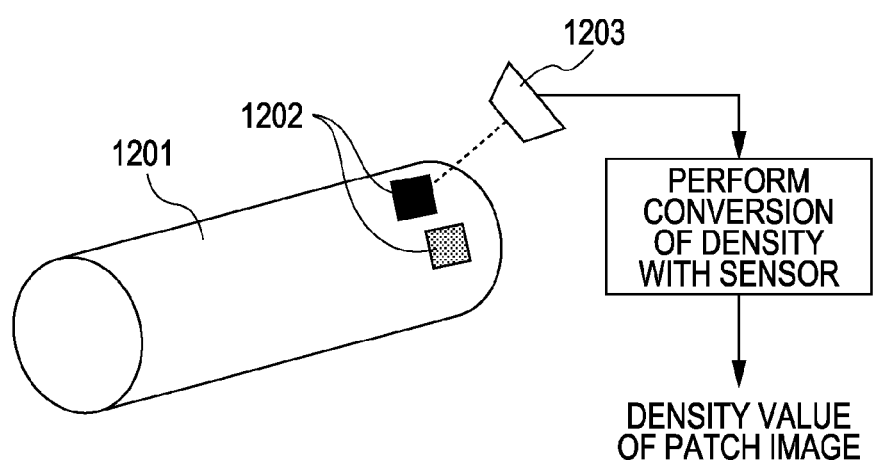

IMAGE FORMING DEVICE, IMAGE FORMING METHOD, AND RECORDING MEDIUM

BACKGROUND OF THE INVENTION

1. Field of the Invention

The present invention relates to an image forming device, an image forming method, and a recording medium for stabilizing an output characteristic of an output apparatus.

2. Description of the Related Art

Recently, print on demand (hereinafter, referred to as "POD") using high-speed combination devices has become widespread in printing industries and copying industries. Efforts to put POD into widespread use have been made in order to print meeting materials or proposals in-house in general companies, and in order to perform pre-press of produced materials or printing of color comprehensive layouts at design offices. These industries have led the workflow of digital printing to be penetrated, and the convenience and cost efficiency thereof have been widely recognized. Accordingly, a "digital commercial printing" market has been formed. Printing devices suitable for the market are printing devices not only that output printing materials having a high quality level, but also that ensure a high productivity.

An electrophotographic method is known as an image recording method used for image forming devices such as copiers. In the electrophotographic method, a latent image is formed on a photoconductor drum by using a laser beam, and the latent image is developed using a charged color material (hereinafter, referred to as "toner"). The image developed using toner is transferred and fixed onto to transfer paper, thereby recording the image.

The electrophotographic method has been employed not only for printing devices serving as combination devices at offices, but also for printing devices that generate printing materials having a high quality level in the "digital commercial printing" market these days.

In the electrophotographic method, a calibration process is a process that is performed in order to allow output images to have a predetermined density quality level. The calibration process is a process that is performed in order to reduce a change in density or color taste of output images that is caused by a change in output density level due to a change over time in printing devices. A general calibration process in the electrophotographic method is described with reference to the drawings. FIG. 10A is a flowchart of an operation flow of the calibration process. FIG. 10B shows times at which the calibration process is performed. In FIG. 10B, the horizontal axis represents time. As shown in FIG. 10B, generally, the calibration process in the electrophotographic method is performed at times at which a flag is input from a printer engine employing the electrophotographic method, or times (T1, T2, and T3) at which an interruption signal is input to a control system. In most cases, the flag/interruption signal may be output at times at which a predetermined number of sheets are printed on. For example, in a case of a printing device in which density correction needs to be performed for output images when the number of sheets that have been printed on reaches 500, the flag/interruption signal is generated by a printer engine every time printing of 500 sheets has finished.

Next, a flow showing performance of the calibration process is described with reference to FIG. 10A. When a predetermined number of sheets have been printed on, a printer engine outputs a flag/interruption signal to a control system (hereinafter, referred to as a "controller") of a printing device (step S501). When the controller receives the flag/interruption flag (YES in step S501), the controller issues an instruction for outputting, to the printer engine, data items of patch images that the printer engine has (step S502). The data items of patch images are image data items having a predetermined size/predetermined density level that are defined for each printer engine. Generally, the data items of patch images are defined as image data items having a plurality of patch-image density levels. FIGS. 11A to 11D are diagrams showing examples of configurations of patch images for a black-and-white printer engine. In FIGS. 11A to 11D, the patch images having four patch-image density levels are defined using H pixels in the main scanning direction, and V pixels in a sub-scanning direction. Patch images defined for a color printer engine are provided for each of components that form a color image. As one typical example, a plurality of patch images having predetermined patch-image density levels are provided for each of cyan (hereinafter, referred to as "C"), magenta (hereinafter, referred to as "M"), yellow (hereinafter, referred to as "Y"), and black (hereinafter, referred to as "B") components.

When the calibration process is performed, patch images are formed at predetermined positions of a photoconductor drum. FIG. 12 shows an example in which patch images are formed on a photoconductor drum. Patch images 1202 that are formed on a photoconductor drum 1201 are not transferred onto transfer paper, which is different from a case in which a normal printing process is performed. Density values of the patch images are read by a sensor 1203 shown in FIG. 12 (step S503). If the density values read by the sensor 1203 are density values corresponding to the patch-image density levels of the patch images, there is no problem. However, in the electrophotographic method, density shifts occur in an output density characteristic when printing of a predetermined number of sheets has finished. For example, a read density value of a patch image having a patch-image density level of 64 may be much higher/lower than a density value corresponding to a density level of 64. The density shifts change in accordance with an influence of an environmental element, such as temperature or humidity of the inside/outside of the printing device, and in accordance with the amount of toner that has been consumed in order to print a predetermined number of sheets. In other words, a density shift of a patch image after an image data item that causes a sheet of white paper to be solidly colored has been printed on a predetermined number of sheets differs from a density shift after an image data item that has a large ratio of a white portion, such as a data item of a character image, has been printed on the predetermined number of sheets.

The calibration process in the electrophotographic method is performed to correct the density shifts. A density correction table that is used to the correct the density shifts is generated using the density values read by the sensor 1203, and the calibration process is performed using the density correction table (step S504).

FIGS. 13A to 13C illustrate a concept of generation of the density correction table. In FIGS. 13A to 13C, the horizontal axis indicates density levels including the patch-image density levels, and the vertical axis indicates output density levels obtained by reading the patch images formed on the photoconductor drum with the sensor 1203. Gridlines of the density levels on the horizontal axis correspond to the patch-image density levels. In this description, four types of patch-image density levels four types, i.e., patch-image density levels of 64, 128, 192, and 255, are provided. The patch images that are formed on photoconductor drum are read by the sensor 1203 to obtain read density values. The read density values are converted into density levels, and the density levels are shown as four points Pa, Pb, Pc, and Pd.

Because, in an ideal output density characteristic, the patch-image density levels are equal to density levels converted from the read density values obtained by the sensor 1203, the output density characteristic is a linear characteristic indicated by a curve W1. However, in most cases, an output density characteristic that exists after a predetermined number of sheets have been printed on is not plotted on the curve W1, as the points Pa to Pd show in FIG. 13A, and is plotted as output density levels that are shifted from the patch-image density levels of the respective patch images. In an example shown in FIG. 13A, the output density levels of the respective patch images are higher than the patch-image density levels plotted on the curve W1. In other words, even when the same image data item is used, a density level of an image obtained using the image data item after a predetermined number of sheets have been printed on, which corresponds to a time in which the calibration process is performed, is higher than a density level of an image obtained using the image data item when printing was started. Output density levels corresponding to density levels other than the patch-image density levels, for example, density levels 65 to 127, or 129 to 191, are determined by an interpolation process using output density levels corresponding to the patch-image density levels that are close to the density levels in most cases. In other words, output density levels corresponding to the density levels 65 to 127 are determined by an interpolation process using values of the points Pa and Pb. As a method of the interpolation process, a one-dimensional linear interpolation process may be used, or an interpolation process using a quadratic term may be used. By the interpolation process, an output density characteristic indicated by a curve W2 is obtained as the correlation between density levels that exist after a predetermined number of sheets have been printed on and output density levels.

By using the curve W2 as a result, the controller of the printing device generates a density correction table that is an inverse-transformation table indicated by a curve W3. The density correction table causes the output density characteristic indicated by the curve W2 that exists after the predetermined number of sheets have been printed on to be transformed into the output density characteristic indicated by the curve W1. An image data item that is input to the printing device is corrected by applying the density correction table indicated by the curve W3 to the image data item, whereby an output image having the linear density characteristic indicated by the curve W1 shown in FIG. 13B can be obtained.

When the density correction table that is the inverse-transformation table indicated by the curve W3 is set, an output density characteristic is obtained as the linear density characteristic indicated by the curve W1 by using the density correction table. However, then, when a predetermined number of sheets have been further printed on, density shifts occur again (FIG. 13C).

FIG. 14 is a graph showing time and density shift of an output image. The horizontal axis indicates time, and the vertical axis indicates output density level. Referring to FIG. 14, a state Ps is a state in which the calibration process was performed immediately before the state Ps, and a state Pe is a state in which printing of a predetermined number of sheets has finished (a time T0). A state Pr is a state in which the calibration process is performed while a job is being performed, and in which the calibration process has been completed (a time T1).

As shown in FIG. 14, a shift of the output density level occurs between the state Ps, which is a state in which the calibration process was performed immediately before the state Ps, and the state Pe, which is a state in which printing of a predetermined number of sheets has finished, corresponding to the time T0. In other words, a noticeable density shift exists between a quality level of an output image that exists immediately after the calibration process was performed and a quality level of an output image that exists immediately before the calibration process is next performed. The density shift (the slope corresponding to the density shift) depends on characteristics of an image that has been printed between the state Ps and the state Pe. In other words, a density shift that exists after an image having a high image ratio, such as a solidly colored image, has been printed on a larger number of sheets differs from a density shift that exists after an image having a low image ratio, which is an image having a large white region, such as a character image, has been printed on a larger number of sheets.

As described above, a process of correcting density shifts after a predetermined number of sheets have been printed on is the calibration process. However, because of a structure of the calibration process, a printing job that is being performed may need to be interrupted while the calibration process is being performed. Interruption of the printing job that is being performed directly leads to a decrease in productivity of the printing device. When a predetermined number of sheets to be printed on before the calibration process is next performed is increased in order to increase the productivity, the productivity is increased. However, the difference between a quality level of an output image that exists immediately after the calibration process was performed and a quality level of an output image that exists before the calibration process is next performed, i.e., the quality level difference (the density level difference), is increased.

Both an increase in productivity and outputting of a high-quality images may be simultaneously required for printing devices that generate, for example, high-quality printing materials in the "digital commercial printing" market. Additionally, in most cases, the printing devices suitable for the "digital commercial printing" market have performances such as a performance in which the number of sheets per minute to be printed on exceeds 100, and printer engines capable of outputting high-quality images are employed in the printing devices.

In order to achieve outputting of high-quality images, density shifts may need to be decreased as much as possible. In other words, ideally, the calibration process may need to be performed fairly often. However, because a printing job being performed needs to be interrupted while the calibration process is being performed, it may be difficult to meet the performance that may be necessary for high-speed devices for POD. Furthermore, the number of sheets per minute that the high-speed devices for POD can print is quite a few. In a case in which the calibration process is performed after a predetermined number of sheets have been printed on, even when a predetermined number of sheets to be printed on before the calibration process is next performed is 2000, the calibration process has typically been performed one time before twenty minutes elapses.

Regarding the decrease in productivity due to performance of the calibration process, Japanese Patent Laid-Open No. 2004-142163 discloses that a density correction process is switched on the basis of information concerning environmental temperature/humidity of the inside/outside of a printing device. FIG. 15 is a diagram showing times at which a calibration process is performed, which is disclosed in Japanese Patent Laid-Open No. 2004-142163. It is disclosed that, when environmental temperature/humidity changes (a time Tk), the calibration process is performed using outputting of patch images or generation of correction data on the basis of a simulation performed by a host device connected to the printing device is selected. The number of performances of the calibration process using outputting of patch images with the printing device is decreased by switching the density correction process on the basis of a change in environmental temperature/humidity of the inside/outside of the printing device, so that the productivity is increased.

Additionally, Laid-Open No. 11-177822 discloses that a time at which a calibration process is performed is changed in accordance with an image-output-operation mode set by a user who uses a printing device. FIG. 16 is a diagram showing times at which the calibration process is performed, which is disclosed in Laid-Open No. 11-177822. It is disclosed that, when an image-output-operation mode in which the calibration process using outputting of patch images does not need to be performed so often is selected by the user after a calibration time T0, the next calibration time T1 is delayed. In this manner, the number of performances of the calibration process using outputting of patch images with the printing device is decreased, so that the productivity is increased.

Laid-Open No. 11-164148 discloses correlation among an operation mode of the calibration process set by a user who uses a printing device, a calibration process, and checking of a quality level of a predicted output image. More specifically, it is disclosed that, it is recognized that the calibration process is performed while a job is being performed, and disclosed that a quality level of the final image to be provided in the job can be checked before the job is performed. FIG. 17 is a diagram showing times at which the calibration process is performed and times at which a quality level of a predicted output image is checked, which is disclosed in Laid-Open No. 11-164148.

In Laid-Open No. 11-164148, a case is described in which three types of operation modes of the calibration process of the printing device, i.e., a high-speed operation mode in which 300 sheets are to be printed on before the calibration process is next performed, a normal speed operation mode in which 150 sheets are to be printed on before the calibration process is next performed, and a high-resolution operation mode in which 50 sheets are to be printed on before the calibration process is next performed, are provided. In a case in which the normal operation mode is set as an operation mode of the calibration process when the user starts using the printing device, and in which, when a job is input, the number of sheets to be printed on that is specified in the job is 200, the calibration process is performed after 150 sheets have been printed on (T0). Accordingly, the last image data item provided in the job is an image data item provided at a time (Tjbe) at which another 50 sheets were printed on after density correction was performed by the calibration process to obtain a linear density characteristic. Laid-Open No. 11-164148 discloses that a density-shift operation coefficient provided at a time at which one sheet was printed on is maintained in advance, that a quality level of an output image is predicted by a proportional calculation, and that the predicted output image is displayed. In other words, in the example described above, the value 50 that is the number of sheets to be printed on after the calibration process is performed is multiplied by the density-shift operation coefficient to generate a predicted output image. The user checks a quality level of the predicted output image before the job is started, and selects/switches the operation mode (the high-speed/normal-speed/high-resolution operation mode) of the calibration process of the printing device.

Regarding the disclosure in Laid-Open No. 2004-142163, it is described that the number of performances of the calibration process using outputting of patch images is reduced in order to improve the productivity. Only an environmental temperature/humidity parameter is focused on for the density correction process. However, as already described, not only the environmental temperature/humidity parameter but also a parameter of an image ratio (an image density level) may be important as a factor of a density shift of an output image that exists after a predetermined number of sheets have been printed on. Furthermore, what type of density correction table is specifically generated using the environmental temperature/humidity parameter in order to perform the density correction process is not described.

In the disclosure of Laid-Open No. 11-177822, a time at which the calibration process is performed can be changed in accordance with the image-output-operation mode. Because a time at which the calibration process is performed is delayed, the productivity is increased. However, a time at which density correction is performed is delayed. Thus, regarding a quality level of an output image in reality, it may be difficult to achieve outputting of a high-quality image, and it may be necessary to allow degradation in quality.

In the disclosure of Laid-Open No. 11-164148, an auxiliary function that a user may use to set the operation mode of the calibration process before a job is started is provided. A density correction process for improving a quality level of an output image is not provided. Additionally, a quality level of the final output image to be provided in a job is predicted and output. However, because a parameter used for prediction has a fixed value, an influence of an image data item that has been printed on before the calibration process is next performed is not considered.

In other words, in the disclosures described above, no solution is particularly provided to achieve both an increase in productivity and an improvement in quality level of an output image that may be necessary for high-speed devices for POD.

SUMMARY OF THE INVENTION

According to an aspect of the present invention, there is provided an image forming device including the following elements: a storing unit configured to maintain density-correction-table lists showing an amount of density changes in respective density levels of images that exist after an image having a predetermined density has been printed on a predetermined number of sheets; an obtaining unit configured to obtain, with reference to values in the density-correction-table lists maintained by the storing unit, the amount of density changes in the respective density levels for an image ratio that exists after the predetermined number of sheets have been printed on and for the predetermined number of sheets that have been printed on; a determining unit configured to determine a density correction characteristic using the amount of density changes obtained by the obtaining unit; a density correction unit configured to perform density correction for image data using the density correction characteristic determined by the determining unit; and an output unit configured to output image data obtained by correction that has been performed by the density correction unit.

In the aspect of the present invention, even when a large number of sheets are printed on, without performing a calibration process with a printer engine while printing is being performed, a density correction process can often be performed with a high accuracy by referring to the density-correction-table lists for an image ratio that exists after a predetermined number of sheets have been printed on and for the number of sheets that have been printed on.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIGS. 2A-1, 2A-2, and 2B are flowcharts of an operation flow showing an embodiment of a method for generating density-correction-table lists.

FIGS. 3A to 3D show embodiments of the method for generating density-correction-table lists and configurations of the density-correction-table lists.

FIG. 5 is a specific example of one of the density-correction-table lists.

FIGS. 11A to 11D are diagrams showing embodiments of configurations of patch images.

FIG. 12 is an illustration of an embodiment of a configuration in which density values of patch images are read.

DESCRIPTION OF THE EMBODIMENTS

Embodiments of the present invention will be described in detail in accordance with the accompanying drawings.

Figure 1:
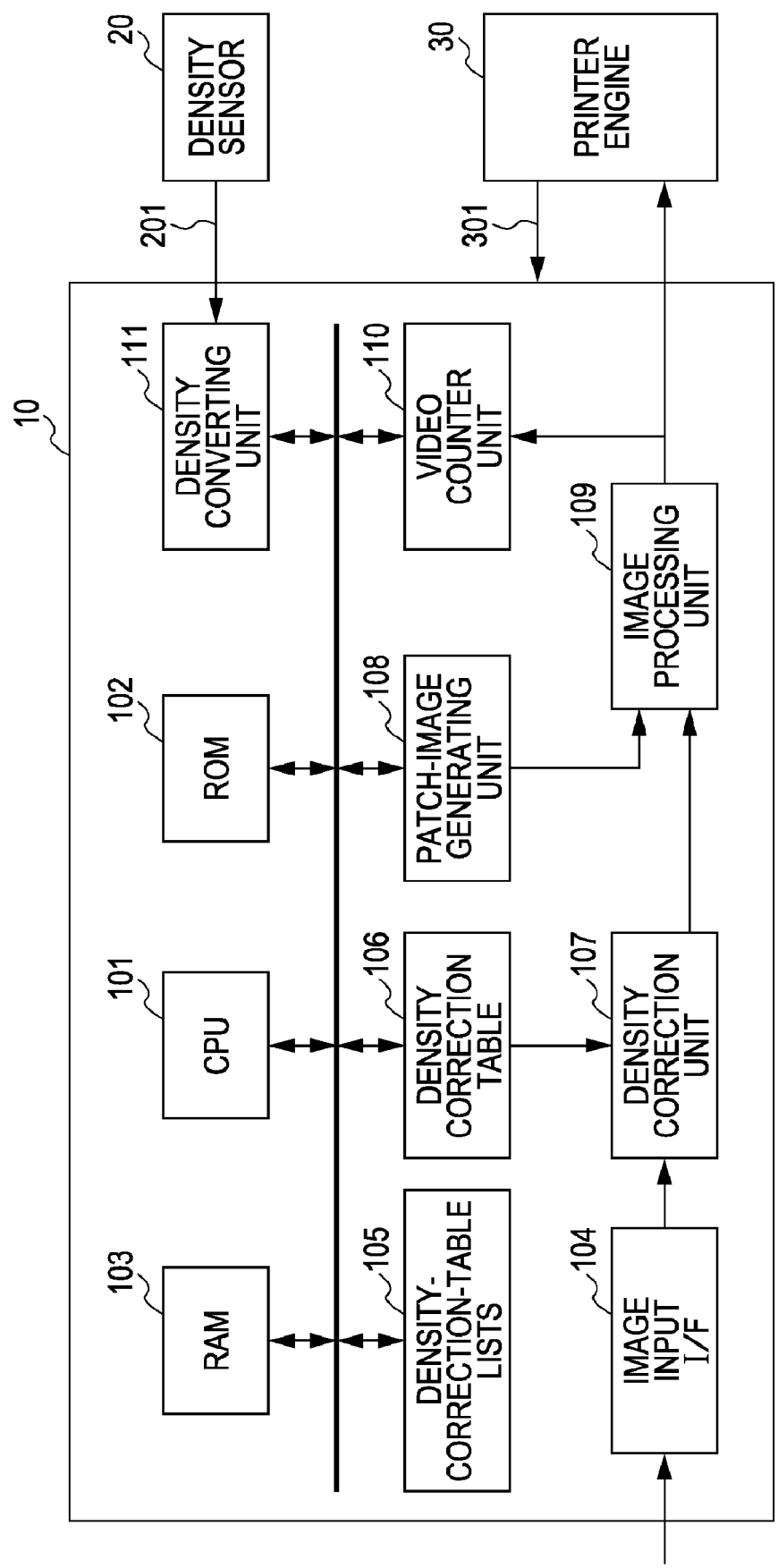
FIG. 1 is a diagram of a configuration of an image forming device according to a first or second embodiment.
Figures 1, 2A:
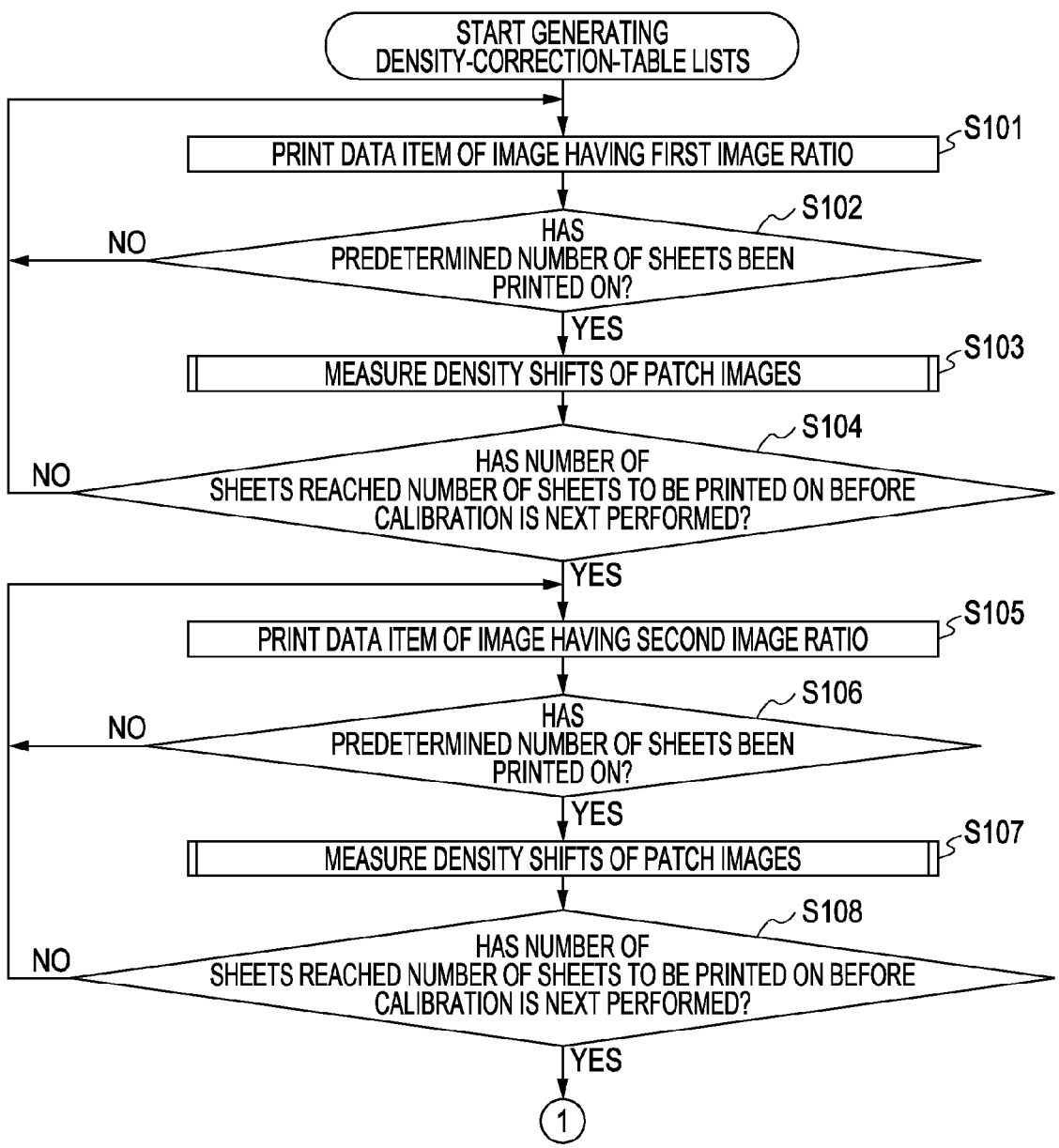
Figures 2, 2A:
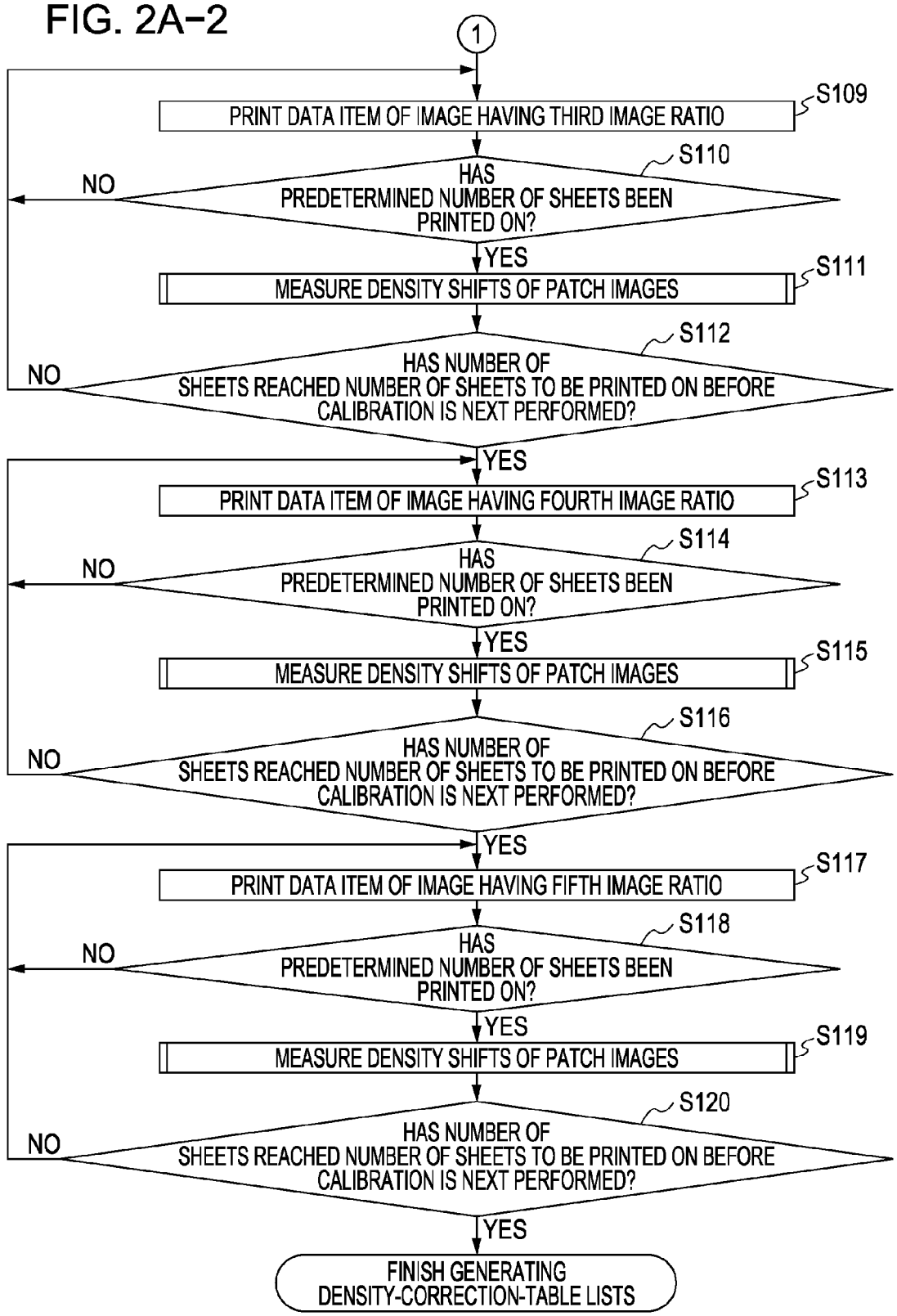

FIG. 1 is a diagram of a configuration of an image forming device according to a first embodiment. The image forming device according to the first embodiment includes an image forming section 10 that performs obtaining of an image data item and forming of an image, a density sensor 20 that measures density values of patch images when a calibration process is performed, and a printer engine 30 that prints an image data item which the image forming section 10 outputs. The image forming device according to the first embodiment may be, for example, a printing device, a copier, a multi-function printer (MFP) having a combination function of a facsimile, a copier, and a printer.

Additionally, the image forming section 10 includes the following processing units. A central processing unit (CPU) 101 exercises overall control of the image forming device. A read-only memory (ROM) 102 stores a control program executed by the CPU 101. A random-access memory (RAM) 103 stores data items that are used when the CPU 101 performs a control operation in accordance with the control program stored in the ROM 102, or is used as an operation area of the CPU 101.

An image input interface (I/F) 104 receives an image data item that is input to the image forming section 10. Density-correction-table lists 105 are distinctive elements in the first embodiment, and show density shifts (amounts of density changes) that occur when a predetermined number of sheets have been printed on by the printer engine 30. A method for generating the density-correction-table lists 105, and configurations of the density-correction-table lists 105 are described below.

Figure 13A:
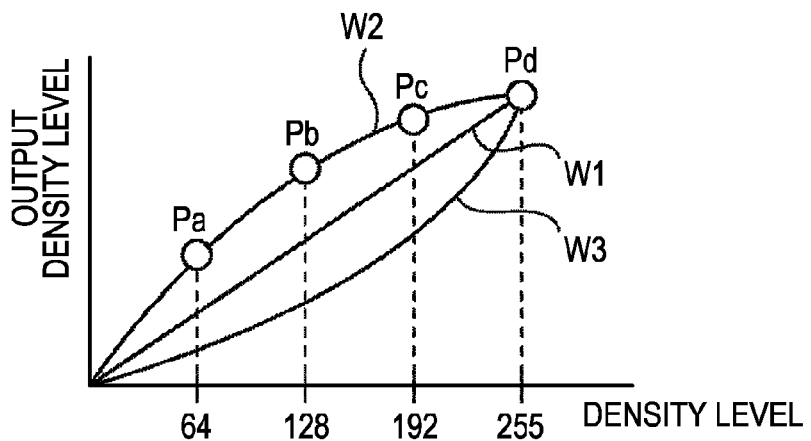
FIGS. 13A to 13C illustrate an embodiment of a concept of generation of a density correction table in the calibration process.
Figure 13B:
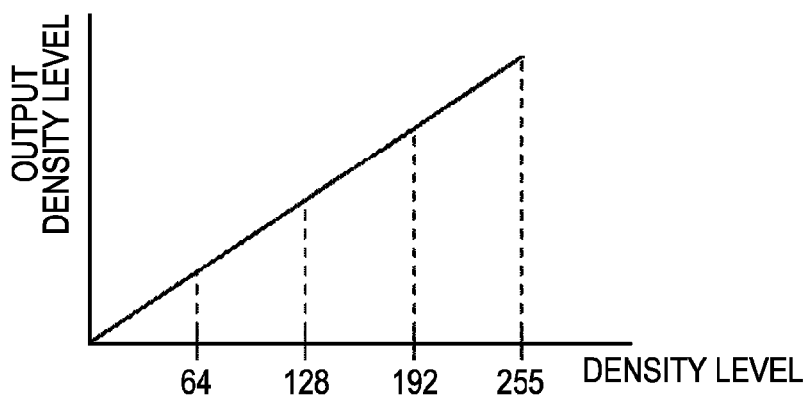
Figure 13C:
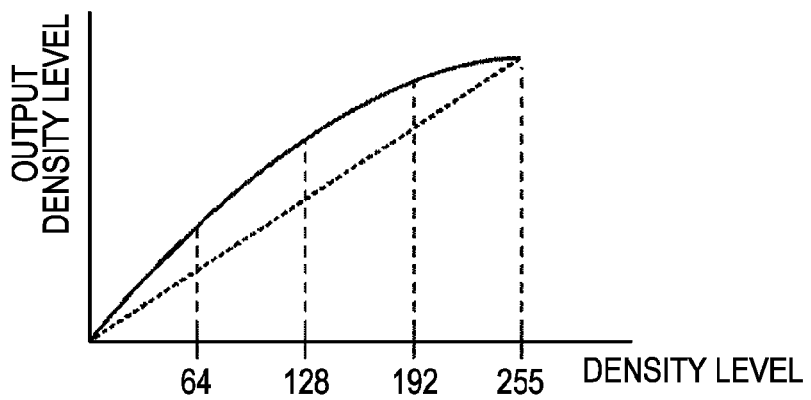
Figure 14:
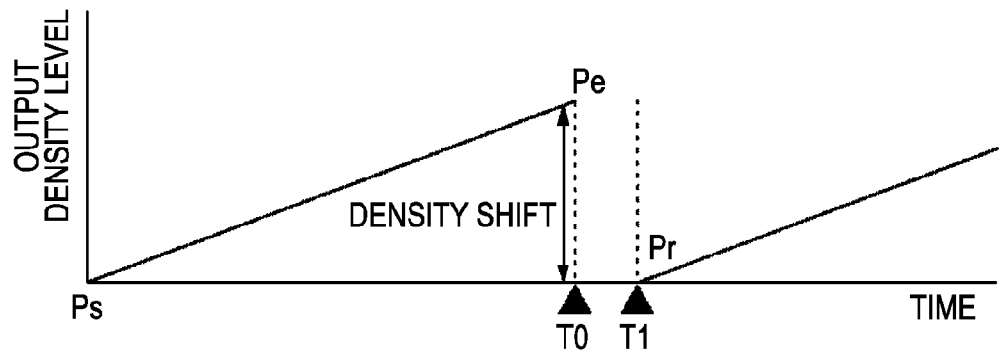
FIG. 14 is a graph showing an embodiment of a density shift in a case in which the calibration process is performed.
Figure 15:
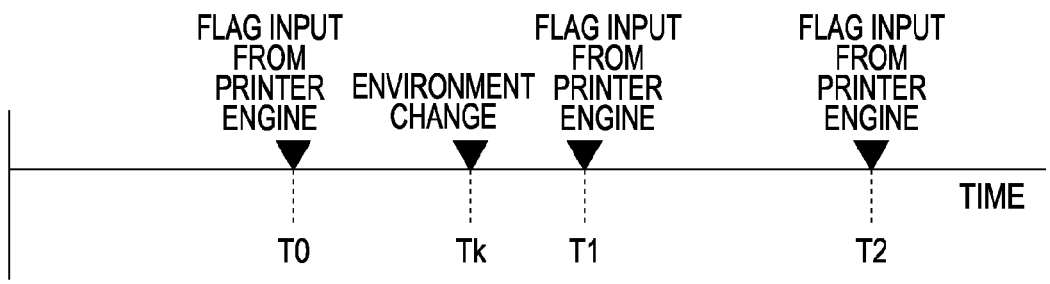
FIG. 15 is a diagram showing an embodiment of times at which a calibration process is performed.
Figure 16:
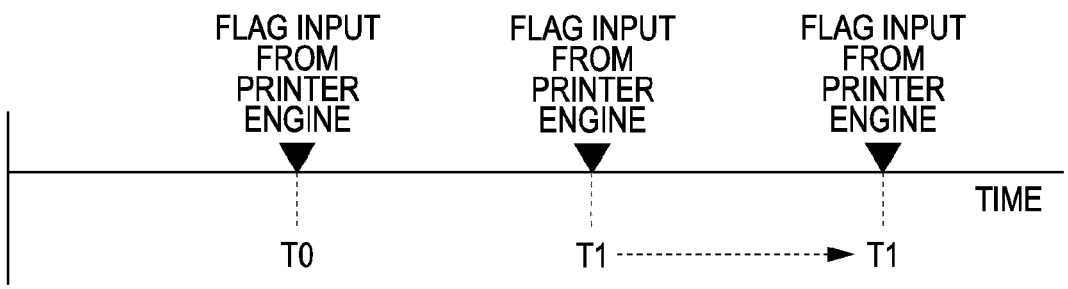
FIG. 16 a diagram showing examples of times at which a calibration process is performed.
Figure 17:
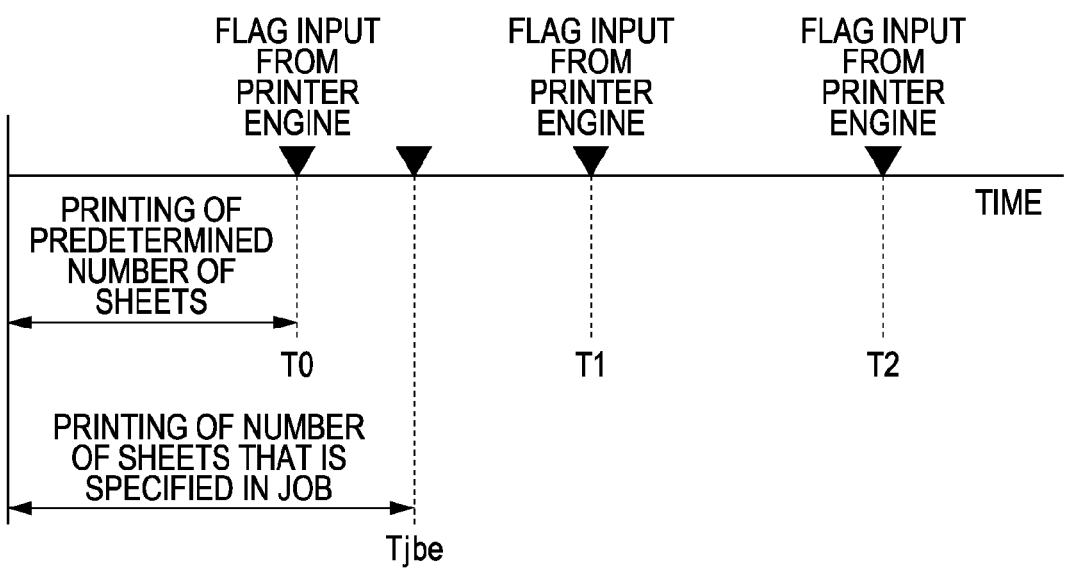
FIG. 17 a diagram showing examples of times at which a calibration process is performed.

A density correction table 106 shows a density correction characteristic, and a density correction coefficient is set by the CPU 101. The density correction coefficient that is set is used to transform a density characteristic including density shifts obtained by reading patch images when the calibration process is performed into a linear density characteristic. In other words, a density correction coefficient corresponding to a curve W3 shown in FIG. 13A is set. A density correction unit 107 performs, using the density correction coefficient stored in the density correction table 106, a density correction process for an image data item that is output from the image input I/F 104. By performing the density correction process with the density correction unit 107, a linear density characteristic is achieved when an image data item that has been input is printed. A patch-image generating unit 108 generates patch-image data items that are used to form patch images when the calibration process is performed. An image processing unit 109 performs an image process for an image data item that is output from the density correction unit 107 or the patch-image generating unit 108.

The image process performed by the image processing unit 109 is a process of converting an image data item that is input, into an image data item having an image format/image-bit number that is used to print the image data item. Examples of the image process include a dither process, a screen process, an error diffusion process, and so forth. In the image forming device according to the first embodiment, the details of the image process performed by the image processing unit 109 are not particularly limited. It may only be necessary that the image process is a process of converting an image data item into an image data item having an image format/image-bit number with which the image data item can be printed in a subsequent image printing process.

A video counter unit 110 counts the number of pixels in which toner is consumed when the image data item that has been processed by the image processing unit 109 is printed. For example, when an image data item that is printed is a grayscale image data item, the video counter unit 110 counts the number of pixels in which a toner containing a K element is consumed. When a color image data item is printed, the video counter unit 110 counts the numbers of pixels in which toners containing corresponding C, M, Y, and K elements are consumed. A density conversion unit 111 converts a read density value that is output from the density sensor 20 into a density level, which is described below.

A signal 201 output from the density sensor 20 corresponds to a value obtained by reading a patch image on a photoconductor drum (not illustrated) when the calibration process is performed, and is output to the density conversion unit 111 provided in the display section 10. Additionally, a trigger/interruption signal 301 output from the printer engine 30 is a calibration request flag/interruption signal that is output to the image forming section 10 side when printing of an image data item on a predetermined number of sheets has finished.

Before a control operation of the image forming device according to the first embodiment in a case in which a job is performed, the density-correction-table lists 105, which may in some embodiments be the most important elements, are described. As already described above, a density shift (an amount of density changes) in a case in which the calibration process is performed largely depends on the image ratio (image density level) of an image that has been printed on a predetermined number of sheets. Accordingly, it may only be necessary to know a correlation among the image ratio (the image density level), the number of sheets that were printed on, and the density shift in advance, so that density can be corrected by estimating the density shift without performing the calibration process using patch images.

Herein, the image ratio indicates a density level of an image. An image ratio of 100% indicates that all of the pixels of an image have a density level of 255 (in a case of eight bits). Additionally, an image ratio of 80% may indicate that all of the pixels of an image have a density level of 204 (in the case of eight bits). Alternatively, the image ratio of 80% may indicate that pixels corresponding to 80% of the entire region of an image has a density level of 255, and that pixels corresponding to the remaining 20% of the entire region have a density level of zero. Furthermore, when the average of density levels of all of the pixels of an image is calculated, the result may be the density level of 204 (in the case of eight bits). Herein, the density level of 204 is a value obtained by calculating 255×0.8 (80%).

FIGS. 2A-1, 2A-2, and 2B are flowcharts of an embodiment of a control flow showing generation of the density-correction-table lists 105. In FIGS. 2A-1, 2A-2, and 2B, as a specific example, a case is described, in which the number of sheets to be printed on before the calibration process using patch images is next triggered by a black-and-white printer engine is 2000, the number of sheets to be printed on before a predictive correction process is next performed is 400, and the number of density levels of the patch images is four. The first embodiment is not limited to the specific example. In other words, for example, a color printer engine may also be used. The number of sheets to be printed on before the predictive correction process is next performed may be decreased/increased. In addition, the number of density levels of the patch images may be increased.

Figure 3A:
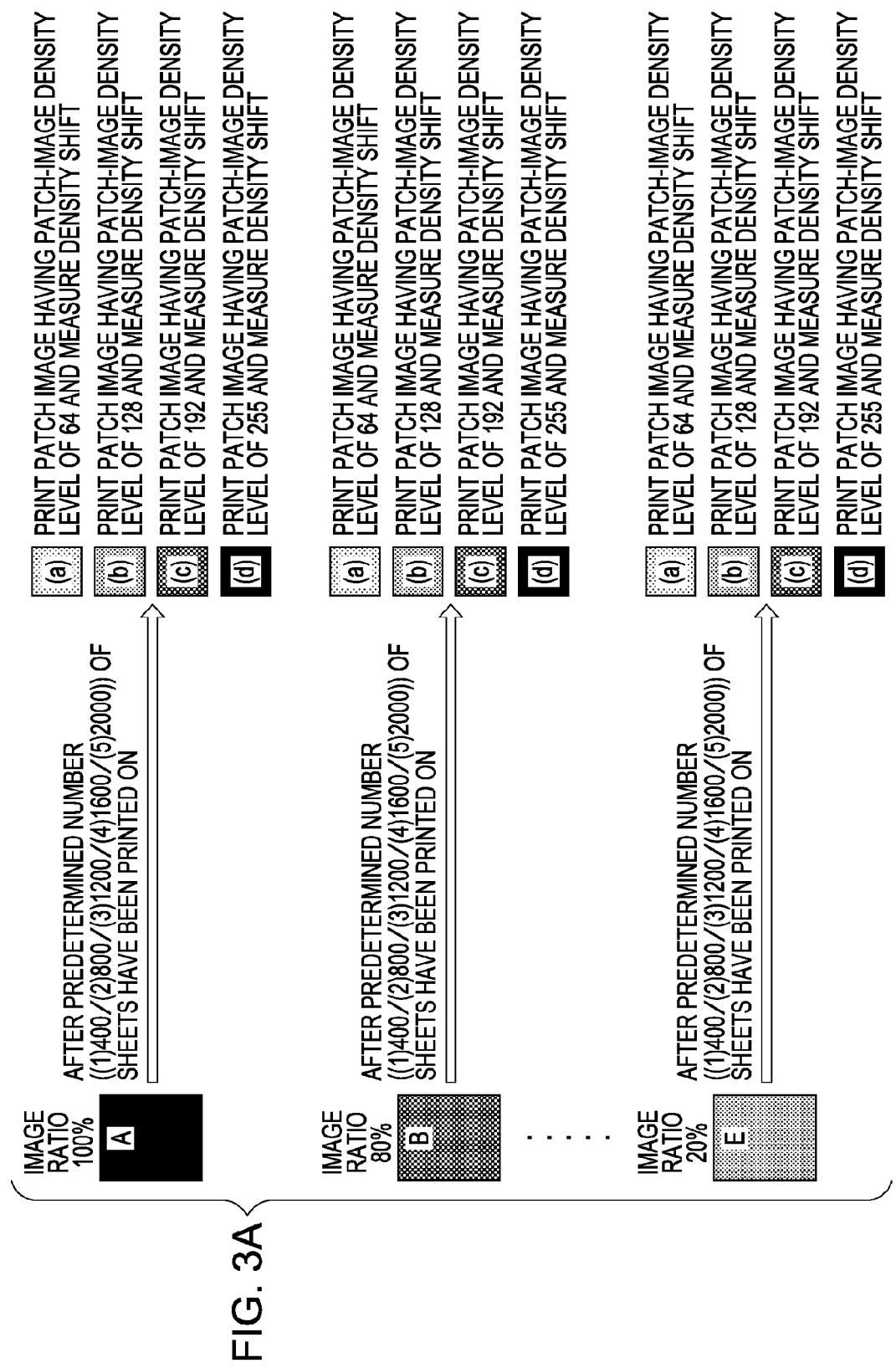

FIGS. 3A to 3D show examples of configurations of the density-correction-table lists 105 in the specific example. Referring to FIG. 3A, the number of types of image ratios to be measured is five. The most intense density is 100%, and the density decreases in steps of 20%. In other words, an image A having an image ratio of 100%, an image B having an image ratio of 80%, an image C having an image ratio of 60%, an image D having an image ratio of 40%, and an image E having an image ratio of 20% are to be measured. In the first embodiment, the number of types of image ratios (image density levels) is five. However, any number of types of image ratios that is equal to or larger than two may be used. Two types of images that are selected from among the images having the image ratios are referred to as an "image having a first image ratio" and an "image having a second image ratio". The number of sheets to be printed on before the predictive correction process is next performed is 400. Accordingly, 2000, which is the number of sheets to be printed on before the calibration process is next performed, is the upper limit, and the predictive correction process is performed after 400 sheets ((1)) have been printed on, after 800 sheets ((2)) have been printed on, after 1200 sheets ((3)) have been printed on, after 1600 sheets ((4)) have been printed on, and after 2000 sheets ((5)) have been printed on. As patch images used to measure density shifts, a patch image (a) having a patch-image density level of 64, a patch image (b) having a patch-image density level of 128, a patch image (c) having a patch-image density level of 192, and a patch image (d) having a patch-image density level of 255 are provided.

Referring to FIGS. 2A-1, 2A-2, and 2B, and FIG. 3A, when generation of the density-correction-table lists 105 is performed, first, printing of the image A having an image ratio of 100% is performed (step S101). In other words, a data item of the image A is transferred to the image input I/F 104. The transferred data item of the image A is input to the density correction unit 107. However, when generation of the density-correction-table lists 105 is performed, no density correction process is performed.

In order to realize a process that does not include performance of the density correction process, the CPU 101 may set, in the density correction table 106, a density correction coefficient that allows the data item which is input to be output as it is. Alternatively, the density correction unit 107 may have a data-bypass function so that the CPU 101 can set the data item.

The data item of the image A that has bypassed the density correction unit 107 is converted into a data item that can be printed by the printer engine 30 by the image processing unit 109 in the image forming device. More specifically, by performing a screen process, the data item of the image A is output as an image data item having a bit configuration that can be used by the printer engine 30 for printing. The image data item converted by the image processing unit 109 is output to the printer engine 30, and is printed as the data item of the image A.

The data item of the image A is continuously output until it is printed on 400 sheets, which is the number of sheets to be printed on before the predictive correction process is next performed. When printing of the data item of the image A on 400 sheets, which is the number of sheets to be printed on before the predictive correction process is next performed, has finished (step S102), the CPU 101 issues an instruction for outputting patch-image data items to the patch-image generating unit 108. The patch-image generating unit 108 outputs data items of predetermined patch images to the image processing unit 109. In the specific example that is described, the number of types of patch images is four. In other words, the patch image (a) having the patch-image density level of 64, the patch image (b) having the patch-image density level of 128, the patch image (c) having the patch-image density level of 192, and the patch image (d) having the patch-image density level of 255 are provided. Referring to FIG. 1, a configuration has been described, in which the patch-image data items generated by the patch-image generating unit 108 are output to the image processing unit 109. However, when predetermined patch-image data items are utilized, a configuration may also be used, in which the patch-image data items that have been processed by the image processing unit 109 are maintained.

The above-described four types of patch images are formed on the photoconductor drum (not illustrated) using the generated patch-image data items. Then, the formed patch images are sequentially read by the density sensor 20 to obtain read density values, and the read density values are output as the signals 201 to the density conversion unit 111 provided in the image forming section 10. When the signals 201 are input to the density conversion unit 111, the density conversion unit 111 performs a conversion process to obtain measured density values of the patch images (steps S201 to S212).

The CPU 101 reads the measured density values of the respective patch images, which are obtained by conversion performed by the density conversion unit 111, and the density values are stored in the RAM 103. The stored density values indicate density shifts of the respective patch images that exist after the image having an image ratio of 100% has been printed on 400 sheets.

Next, density shifts of the patch images in a case in which the data item of the image A is additionally printed on 400 sheets are measured. In other words, density values of the patch images that exist after the image A having an image ratio of 100% has been printed on 800 sheets are measured in accordance with the above-described process steps. Measured density values of the respective patch images, which are obtained by conversion, are stored in the RAM 103 or another storage unit to which the CPU 101 can access. The stored values indicate density shifts of the respective patch images that exist after the image having an image ratio of 100% has been printed on 800 sheets. In the case of the image A, the number of sheets to be printed on is increased by 400 every time density shifts of the patch images are measured, and the process of measuring density shifts of the patch images is continuously performed (step S103 and step S104).

When measuring of the density shifts that exist after the image A was continuously printed has finished, next, a similar process is performed for a data item of the image B. In other words, printing of the image B having an image ratio of 80% is continuously performed until 400 sheets, which is the number of sheets to be printed on before the predictive correction process is next performed, are printed on (step S105).

When printing of the image B on 400 sheets, which is the number of sheets to be printed on before the predictive correction process is next performed, has finished (YES in step S106), the CPU 101 issues an instruction for outputting patch-image data items to the patch-image generating unit 108.

The patch-image generating unit 108 outputs data items of predetermined patch images to the image processing unit 109. In this case, the data items of predetermined patch image are the same as those of the patch images used to measure the density shifts for the image A. In other words, the predetermined patch images correspond to the four types of patch images, i.e., the patch image (a) having the patch-image density level of 64, the patch image (b) having the patch-image density level of 128, the patch image (c) having the patch-image density level of 192, and the patch image (d) having the patch-image density level of 255.

As in the case in which the density shifts are measured for the image A, the above-described four types of patch images are formed on the photoconductor drum (not illustrated) using the generated patch-image data items. Then, the formed patch images are sequentially read by the density sensor 20 to obtain read density values, and the read density values are output as the signals 201 to the density conversion unit 111 provided in the image forming section 10. When the signals 201 are input to the density conversion unit 111, the density conversion unit 111 performs a conversion process to obtain measured density values of the patch images.

The CPU 101 reads the measured density values of the respective patch images, which are obtained by conversion performed by the density conversion unit 111, and the density values are stored in the RAM 103. The stored density values indicate density shifts of the respective patch images that exist after the image having an image ratio of 80% has been printed on 400 sheets.

Next, density shifts of the patch images that exist after the data item of the image B has been additionally printed on 400 sheets are measured. In other words, density values of the patch images that exist after the image B having an image ratio of 80% has been printed on 800 sheets are measured in accordance with the above-described process steps. Measured density values of the respective patch images, which are obtained by conversion, are stored in the RAM 103. The stored values indicate the density shifts of the respective patch images that exist after the image having an image ratio of 80% has been printed on 800 sheets. In the case of the image B, as in the case of the image A, the number of sheets to be printed on is increased by 400 every time density shifts of the patch images have been measured, and the process of measuring density shifts of the patch images is continuously performed (step S107 and step S108).

Also in the case of the images C, D, and E, after the images C, D, and E have been continuously printed on a predetermined number of sheets, density shifts of the patch images are measured in accordance with the process steps that are described in the case of the image A or B. In other words, processes for the image C (steps S109 to S112), processes for the image D (steps S113 to S116), and processes for the image E (steps S117 to S120) are performed. Note that the difference between the processes for each of the images in the process steps and the processes for the image A or B is only the image ratio that is used for printing. In other words, the processes for each of the images in the process steps are the same as the processes for the image A or B in that density shifts of the patch images are measured after the predetermined number of sheets have been printed on, and in that the processes are repeated until the number of sheets that have been printed on reaches the number of sheets to be printed on before the calibration process is next performed. The density-correction-table lists 105 shown in FIG. 3B are completed by this measurement.

Referring to FIG. 3B, for example, a data item that is placed at a position shown as "C (1) (a)" in one of the density-correction-table lists 105 is a measured density value in a case in which the patch image (a) having the patch-image density level of 64 is formed after the image C having an image ratio of 60% has been continuously printed on 400 sheets ((1)). Additionally, a data item that is placed at a position shown as "D (4) (a)" is a measured density value in a case in which the patch image (a) having the patch-image density level of 64 is formed after the image D having an image ratio of 40% has been continuously printed on 1600 sheets ((4)).

Referring to FIG. 3B, measured density values are shown in the density-correction-table lists 105 as they are. However, the configuration of the density-correction-table lists 105 is not limited thereto. For example, for each of the patch images, by using a measured density value obtained after the image having an image ratio of 100% has been continuously printed on 2000 sheets as a reference value, the other elements in the density-correction-table lists 105 may be normalized (FIG. 3C). Alternatively, by using a measured density value obtained after the image having an image ratio of 20% has been continuously printed on 400 sheets as a reference value, the other elements in the density-correction-table lists 105 may be normalized (FIG. 3D).

A configuration in which the black-and-white printer engine is provided is used in the description of generation of the density-correction-table lists 105. However, the configuration is not limited thereto. In other words, a configuration may be used, in which patch images having a plurality of density levels for each of elements (C, M, Y, and K) that are used to form a color image are defined, in which density values are measured after an image having a predetermined image ratio has been continuously printed, and in which the measured density values are set in the density-correction-table lists for each of the elements.

In a case in which the density-correction-table lists are generated, when the number of density-correction-table lists corresponds to the number of environments in which the image forming device operates, it is obvious that the accuracy of the density correction process will be increased. For example, a sensor that detects environments of the inside/outside of the image forming device or the like is provided, and the density-correction-table lists are configured for each of a normal temperature, a hot temperature, and a low temperature. When printing is performed, the density correction process may be performed with reference to a density correction table for an appropriate environment. Furthermore, a plurality of density-correction-table lists may be configured for environmental elements including not only temperature but also humidity.

Moreover, when toner that the printer engine uses when it performs printing is supplied from a cartridge configured as a unit instead of from a cartridge for which supplying of toner is performed, it is known that an amount of density changes in the output of the printer engine depends on the amount of the toner remaining in the cartridge. Accordingly, also in order to perform the predictive correction process with a high accuracy using the cartridge-type printer engine, the density-correction-table lists may be configured so that the number of density-correction-table lists corresponds to a plurality of amounts of the toner remaining in the cartridge. For example, density-correction-table lists may be configured for three periods, i.e., a period from a state in which a new cartridge is installed into the printer engine (a state in which the cartridge is filled with toner) to when one quarter of the amount of the toner is consumed, a period from when one quarter of the amount of the toner has been consumed to when three quarters of the amount of the toner is consumed, and a period from when three quarters of the amount of the toner has been consumed.

Additionally, when no unit that detects the amount of the toner remaining in the cartridge is provided, the accuracy of the predictive correction process is reduced. However, in such a case, the number of sheets that have been printed on is counted, and the amount of the toner that has been used is predicted by using the average amount of the toner that is typically necessary in order to print an image data item on one sheet. The density correction process is performed on the basis of the predicted amount of the toner by using the density-correction-table lists.

In the description given above, the density-correction-table lists for the environmental elements of the inside/outside of the image forming device and the density-correction-table lists for elements related to supplying of toner (the cartridge) are separately described. However, when density-correction-table lists are generated for combinations of the plurality of elements, it is obvious that the accuracy of the predictive correction process will be increased.

Figure 4:
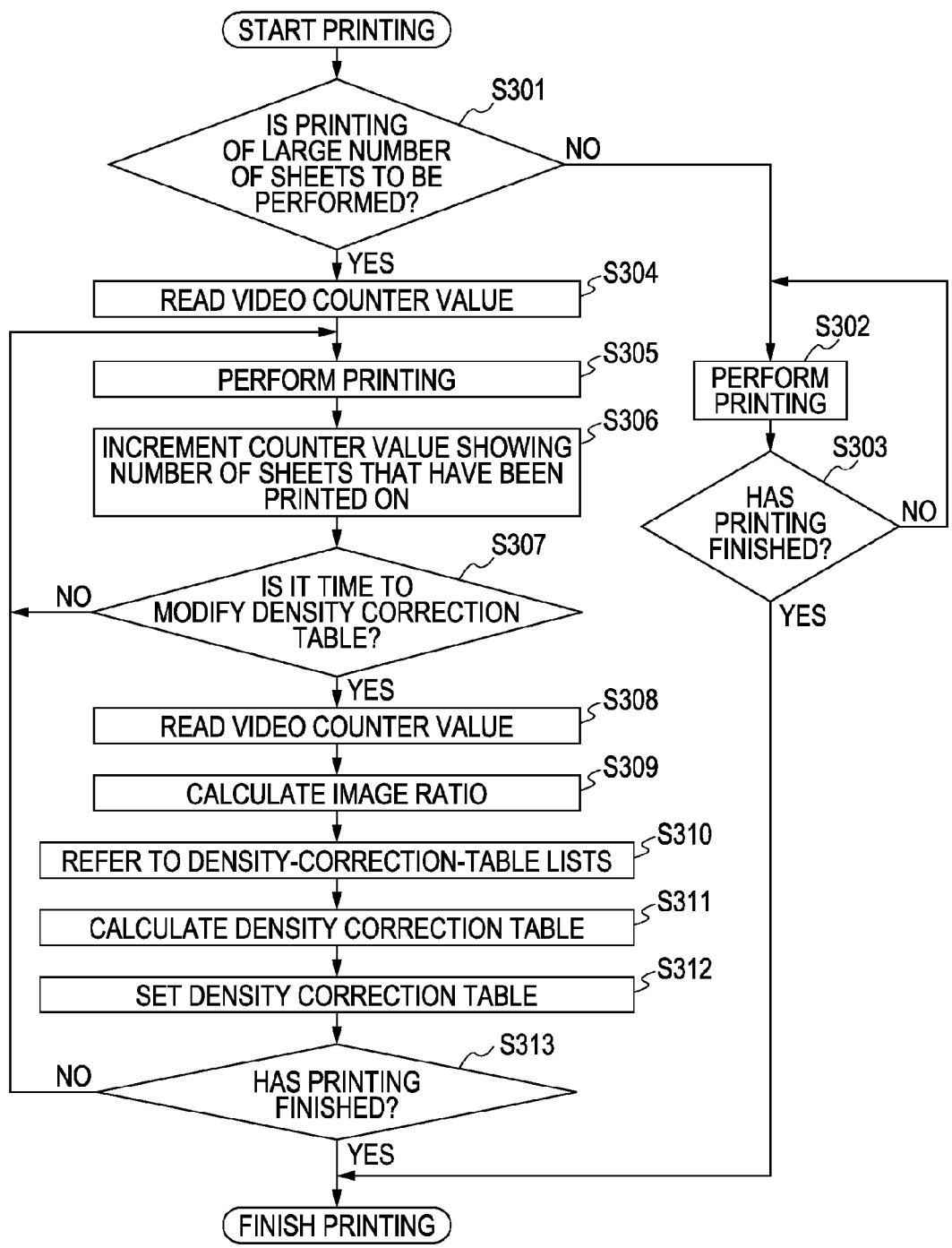
FIG. 4 is a flowchart of an embodiment of an operation flow showing a density correction method in the first embodiment.

Next, how to perform the density correction process using the density-correction-table lists will be described with reference to another drawing. FIG. 4 is a flowchart of an embodiment of an operation flow showing a density correction method for the image forming device according to the first embodiment. A case is described below, in which the image forming device is a high-speed black-and-white device for POD. In addition, in the description, the number of sheets to be printed on before the printer engine 30 next requests the calibration process is 2000, and a time at which the density correction table is modified corresponds to 400 sheets.

When a printing job is input to the image forming device according to the first embodiment, the CPU 101 determines whether or not the job that is input is printing of a large number of sheets (step S301). When the job that is input is printing of a small number of sheets (NO in step S301), the image forming device starts printing an image data item that is input (step S302). In other words, the density correction unit 107 performs the density correction process using a predetermined setting of the density correction table 106 for an image data item that is input via the image input I/F 104. An image data item obtained by performing the density correction process is subjected to the image process by the image processing unit 109, and is output to the printer engine 30. Printing of the image data item is repeated (step S303).

While the printing of a small number of sheets is being performed, when the number of sheets that have been printed on has reached the number of sheets to be printed on before the printer engine 30 may next require the calibration process, the printer engine 30 outputs the trigger/interruption signal 301 that triggers the calibration process to the image forming section 10. When the CPU 101 included in the image forming device receives the trigger/interruption signal 301, the CPU 101 interrupts printing and performs the calibration process.

More specifically, the CPU 101 issues an instruction for outputting patch-image data items to the patch-image generating unit 108. The patch-image generating unit 108 outputs data items of predetermined patch images to the image processing unit 109. The image processing unit 109 performs the predetermined image process for the patch-image data items that have been input to obtain output image data items, and outputs the output image data items to the printer engine 30. The patch images are formed on the photoconductor drum using the patch-image data items that have been output. Density values of the patch images are read by the density sensor 20. The read density values are input to the density conversion unit 111 as the signals 201 to be converted into measured density values. The CPU 101 calculates a density correction table on the basis of the measured density values of the respective patch images, which are obtained by the conversion performed by the density conversion unit 111, so that a linear density characteristic can be achieved using the density correction table in a job that is to be performed after this point.

The density correction table is set as the density correction table 106. After the CPU 101 completes setting of a density correction coefficient in the density correction table 106, the CPU 101 restarts performing of the job, i.e., the printing process.

In the description given above, when printing of a small number of sheets is performed, the calibration process is performed immediately after the trigger/interruption signal 301 that triggers the calibration process is input from the printer engine 30. However, performance of the calibration process immediately after the trigger/interruption signal 301 is input may not be a required condition. The reason for this is that, because a job execution time is not so long when a small number of sheets are printed on, density shifts of output density levels are not so large. In other words, even when the trigger/interruption signal 301 is input, the calibration process may be controlled to be postponed until a job that is being performed is completed. Productivity reduction caused by performance of the calibration process can be suppressed by controlling the calibration process in this manner.

Next, the density correction process that is distinctive in the first embodiment will be described. In step S301, the job that is input is printing of, for example, a large number of 3000 sheets (YES in step S301), the CPU 101 performs reading of a video counter value at a time at which the job is input. More specifically, the CPU 101 reads the video counter value that is measured/maintained in the video counter unit 110 (step S304). The CPU 101 causes the RAM 103 that is an operation area of the CPU 101, or another storage unit (not illustrated) to which the CPU 101 can access to store the video counter value that has been read.

When reading/storing of the video counter value is completed, the image forming device according to the first embodiment starts a printing process, and a counter value showing the number of sheets that have been printed on is incremented by one every time printing of one sheet has finished (steps S305 and S306). Because the printing process performed by the image forming section 10 is the same as that in the description of step S302, the description thereof is omitted herein. When the number of sheets that have been printed on reaches the number of sheets corresponding to a time at which the density correction table is modified (in the first embodiment, after printing of 400 sheets has been completed) (step S307), the CPU 101 reads the video counter value that is continuously measured by the video counter unit 110 again (step S308). Note that, when the number of sheets that have been printed on has not reached the number of sheets corresponding to a time at which the density correction table is modified in step S307, the processes in steps S305 and S306 are repeated. The video counter value indicates the amount of toner that has been consumed for printing performed by the printer engine 30. Accordingly, the difference between the video counter value that was read/stored when the job was input and the video counter value that is read again indicates the amount of toner consumed in a case in which 400 sheets are printed on. As already described, an amount of density changes that occur while the printing process is being performed depends on density of the image data item that is printed. Because the difference between the video counter values corresponds to the amount of toner that has been used, the difference can be used as an image ratio (an image density level) that has been used for printing (step S309). Additionally, the total amount of density levels in a case in which a plurality of sheets are printed on is divided by the number of sheets that have been printed on to obtain the average value of the density level for one sheet, and the average value of the density level for one sheet may be used as an image ratio.

For example, when a data item obtained from the difference between the video counter values indicates an image ratio of 20%, the CPU 101 refers to values maintained in the density-correction-table lists 105 (step S310). In the first embodiment, the density correction table is modified every time 400 sheets have been printed on. Accordingly, a value placed in a column of "E (1) (a)" of one of the density-correction-table lists 105 shown in FIG. 3B is referred to as a density shift in the patch-image density level of 64 in this case.

Because, similarly, density shifts in the patch-image density levels of 128, 192, and 255 are maintained in the density-correction-table lists 105, the CPU 101 reads and refers to values placed in corresponding columns of the density-correction-table lists 105. The density shifts maintained in the density-correction-table lists 105 are generated in accordance with the characteristics of the printer engine 30. Accordingly, in a case in which the CPU 101 refers to the density-correction-table lists 105, when the CPU 101 has information concerning the image ratio and the number of sheets that have been printed on, the CPU 101 can obtain the density shifts (the amount of density changes) of the respective patch images with a high accuracy. The CPU 101 calculates, on the basis of the density shifts (the amount of density changes) of the respective patch images that are obtained from the density-correction-table lists 105, a density correction coefficient that is to be set in the density correction table 106, and determines a density correction table (step S311). Regarding a density correction coefficient for a density level that is not used as any one of the patch-image density levels is calculated by an interpolation operation using density shifts in patch-image density levels that are around the density level. For example, a density shift for a density level of 100 is determined by, for example, a linear interpolation operation using the density shift of the patch image having a patch-image density level of 64 and the density shift of the patch image having a patch-image density level of 128.

Next, at a point in time at which density shifts for all of the density levels are determined, the CPU 101 sets the density correction coefficient for an image data item that is to be input via the image input I/F 104 after this point in the density correction table 106 (step S312). More specifically, an inverse-transformation density correction coefficient is set so that a characteristic including the density shifts in the respective density levels is transformed using the inverse-transformation density correction coefficient into a linear density characteristic. Because setting of the density correction table 106 in this manner is performed on the basis of the density shifts maintained in the density-correction-table lists 105, the calibration process, such as generation of the data items of the patch images or formation of the patch images on the photoconductor drum, is not performed at all. In other words, the job that has been input is not interrupted in a long period.

When the image ratio calculated in step S309 does not coincide with any one of the image ratios used in the density-correction-table lists 105, the CPU 101 calculates a density shift using two density shifts for image ratios that are close to the calculated image ratio. For example, the density-correction-table list 105 in the patch-image density level of 64 has the values shown in FIG. 5. When the image ratio that has been calculated using the video counter value is 32%, the CPU 101 uses a density shift (10) for the image ratio of 20% and a density shift (25) for the image ratio of 40%. When a linear interpolation operation is used as an interpolation method, a density shift for the image ratio of 32% is determined using the equation (1).

$$(25 \times 6 + 10 \times 4)/10 = 19 \qquad \text{equation (1)}$$

The same operation is performed for density shifts for the other patch-image density levels. By using operation results, an inverse-transformation density correction coefficient is set so that a density characteristic including the density shifts in the respective density levels is transformed using the inverse-transformation density correction coefficient into a linear density characteristic.

Because the number of sheets to be printed on that is specified in the job which has been input is 3000, the image forming device according to the first embodiment continues the printing operation (step S313). When another 400 sheets have been printed on in the image forming device, the CPU 101 reads the video counter value that is continuously counted by the video counter unit 110. Then, the CPU 101 calculates, using the video counter value stored in the operation area of the CPU 101 or stored in another storage unit, an image ratio that exists after 800 sheets have been printed on. The CPU 101 refers to the applicable density shifts for the calculated image ratio in the density-correction-table lists 105 for a second time. The CPU 101 calculates a density correction table that is to be set as the density correction table 106, and sets the density correction table as the density correction table 106. Because setting of the density correction table 106 for a second time is also performed with reference to the density-correction-table lists 105, the calibration process that is to interrupt the job is not performed.

The image forming device according to the first embodiment repeats the processes of steps S302 to S312 until the printing job that has been input is completed. Even when the trigger/interruption signal 301 that triggers the calibration process is output from the printer engine 30 while setting of the density correction table 106 is being performed using the values maintained in the density-correction-table lists 105, the image forming device disregards the trigger/interruption signal 301. In other words, when the job of printing a large number of sheets is input, the calibration process that is to interrupt the job is not performed until the job is completed.

Figure 6A:
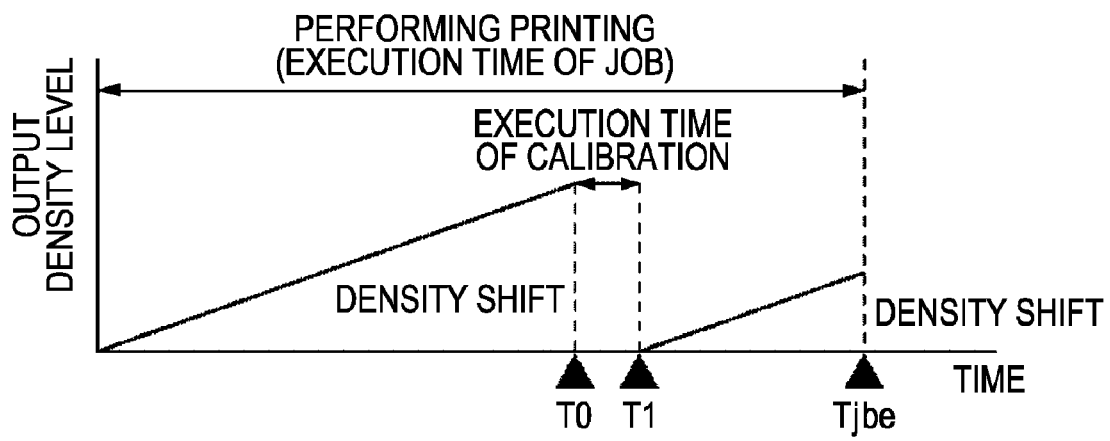
FIGS. 6A and 6B are graphs showing an embodiment of a time at which a calibration process is performed and density shifts.
Figure 6B:
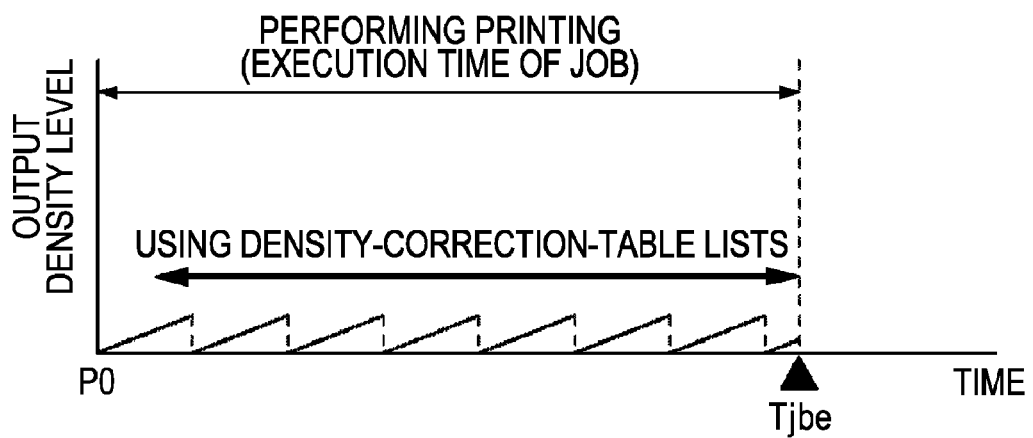

FIGS. 6A and 6B are graphs showing density shifts. In FIGS. 6A and 6B, the horizontal axis represents time, and the vertical axis represents output density level. FIG. 6A is a graph showing a job execution time and density shifts in a case in which the calibration process is performed while a job is being performed without utilizing the image forming device according to the first embodiment. As is clear from FIG. 6A, because a period of time from a time (T0) at which the calibration process is started to a time (T1) at which the job is restarted may be necessary, a period of time to a time (Tjbe) at which the job is completed may be longer. Additionally, because the density correction coefficient is not reset before the time (T0) at which the calibration process is started, a density shift may increase.

Next, FIG. 6B is a graph showing density shifts in the first embodiment. In FIG. 6B, the horizontal axis represents time, and the vertical axis represents output density level. As is clear from FIG. 6B, in a case in which a large number of sheets are printed on, the image forming device according to the first embodiment does not perform the calibration process that is to interrupt the job while printing is being performed at all. Additionally, because the density correction table 106 is set using the density-correction-table lists 105 every 400 sheets, which is much fewer than 2000 sheets that is the number of sheets to be printed on before the printer engine 30 next triggers the calibration process, the density shifts can be largely reduced. Furthermore, even when a request for the calibration process is input from the printer engine 30 while the job is being performed (at the time T0), the request is not accepted, and setting of a density correction table using the density-correction-table lists 105 is performed. In other words, no process that would cause the time (Tjbe) at which the job is completed to be delayed is performed at all. Thus, the image forming device according to the first embodiment has a high productivity, and can perform the printing job that is input while a high-quality image is being output.

Figure 7:
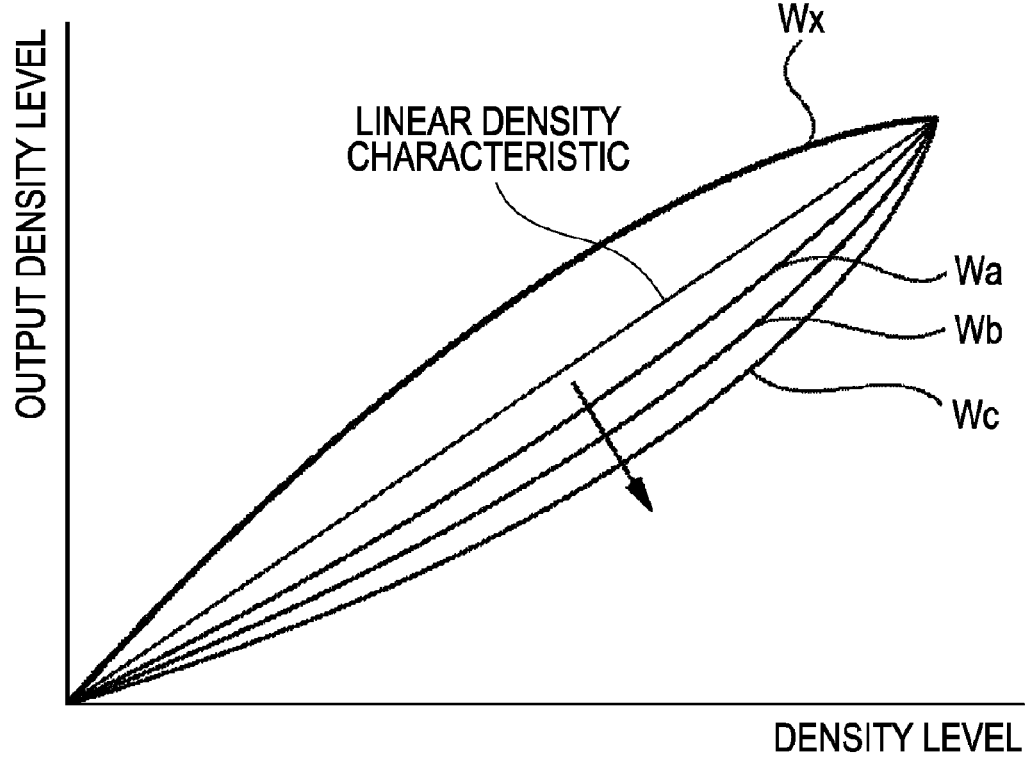
FIG. 7 is a graph showing an embodiment of a setting of a density correction table in the first embodiment.

Moreover, FIG. 7 is a graph showing a setting of the density correction table 106 when the density correction table 106 is modified every time a predetermined number of sheets have been printed on. In FIG. 7, a curve Wx indicates density shifts in the respective density levels that exist after printing of the predetermined number of sheets, which is specified for the printer engine 30, has finished. The image forming device according to the first embodiment does not set the density correction table 106 for the curve Wx including the density shifts only at one time. The density correction table 106 is set step by step, i.e., every time a number of sheets has been printed on that is much fewer than the number of sheets to be printed on before the printer engine 30 triggers the next calibration process. In other words, when setting of the density correction table 106 is performed in three steps as shown in FIG. 7, the density correction table 106 is set step by step, i.e., in the three steps corresponding to curves Wa, Wb, and Wc.

In the description given above, the image ratio that is used to refer to the density-correction-table lists 105 is defined in units of 20%, and the number of sheets to be printed on that is used to refer to the density-correction-table lists 105 is defined in units of 400 sheets. However, the definitions in the first embodiment are not limited thereto. In other words, in a step of generating the density-correction-table lists 105, the density-correction-table lists 105 may be generated using the image ratio that is defined in smaller units and the number of sheets to be printed on that is defined in smaller units. In such a case, the density correction process can be performed every time a number of sheets has been printed on that is much fewer than the number of sheets to be printed on before the printer engine 30 triggers the next calibration process.

Also in the first embodiment, the video counter value is read immediately after a time at which a job of printing a large number of sheets was input. However, at this point, first, the calibration process may be performed, in which the patch images are formed on the photoconductor drum. By performing the calibration process before the job that was input is performed, a linear density characteristic is ensured before printing is started. Thus, after that, the density correction process is performed that uses the density-correction-table list 105 and that does not include performing of the calibration process, so that a higher-quality image can be printed.

Additionally, after the printing job that was input has been completed, i.e., when the image forming device enters an idle state, the calibration process may be performed, in which the patch images are formed on the photoconductor drum. When the image forming device is in the idle state, the image forming device has plenty of time because it has no job to be processed. Accordingly, a process for improving the accuracy of the density-correction-table lists 105 in the first embodiment can be performed. More specifically, when the job that was input has been completed, an image ratio for the entire job that was immediately previously performed can be calculated using the video counter value. In other words, after the job was performed, the calibration process is performed to measure density shifts of the patch images. The measured density shifts of the patch images are the latest density shifts for the image ratio in a case in which the image forming device operates in a real environment. Accordingly, the density shifts measured as described above are compared with density shifts that are used for an environment which is applicable at this point and that are maintained in the density-correction-table lists 105, and the density-correction-table lists 105 are rewritten using the latest data items obtained in a case in which the image forming device operates in a real environment. In this manner, by performing the calibration process in the idle state, the density-correction-table lists 105 can usually, and even always, maintain density shifts that are measured with a high accuracy. In other words, the density correction process can be performed with a higher accuracy for a job that is to be input after this point.

As described above, in the first embodiment, the density-correction-table lists are generated, in which the density shifts of the respective patch images that exist after the images having the predetermined image ratios have been printed on the predetermined number of sheets are defined. The density-correction-table lists are referred to while a job is being performed, thereby performing the density correction process. Thus, when a job of printing a large number of sheets is performed, no calibration process triggered by the printer engine is performed while the printing process is being performed. In addition, the density correction process can be performed every time a number of sheets has been printed on that is fewer than the number of sheets to be printed on before the printer engine triggers the next calibration process. In other words, a "throughput degradation (performance degradation)" and the "difference between image quality levels before and after performance of the calibration process" in high-speed image forming devices for POD can be simultaneously improved.

Next, a second embodiment will be described. Also in the description of the second embodiment, components common to the first embodiment and the second embodiment are designated by the same reference numerals shown in the same drawings.

The second embodiment may differ from the first embodiment in that, after an image ratio is calculated in accordance with the operation flow showing the density correction method in the first embodiment, the CPU 101 determines whether the calculated image ratio satisfies a predetermined condition.

Figure 8:
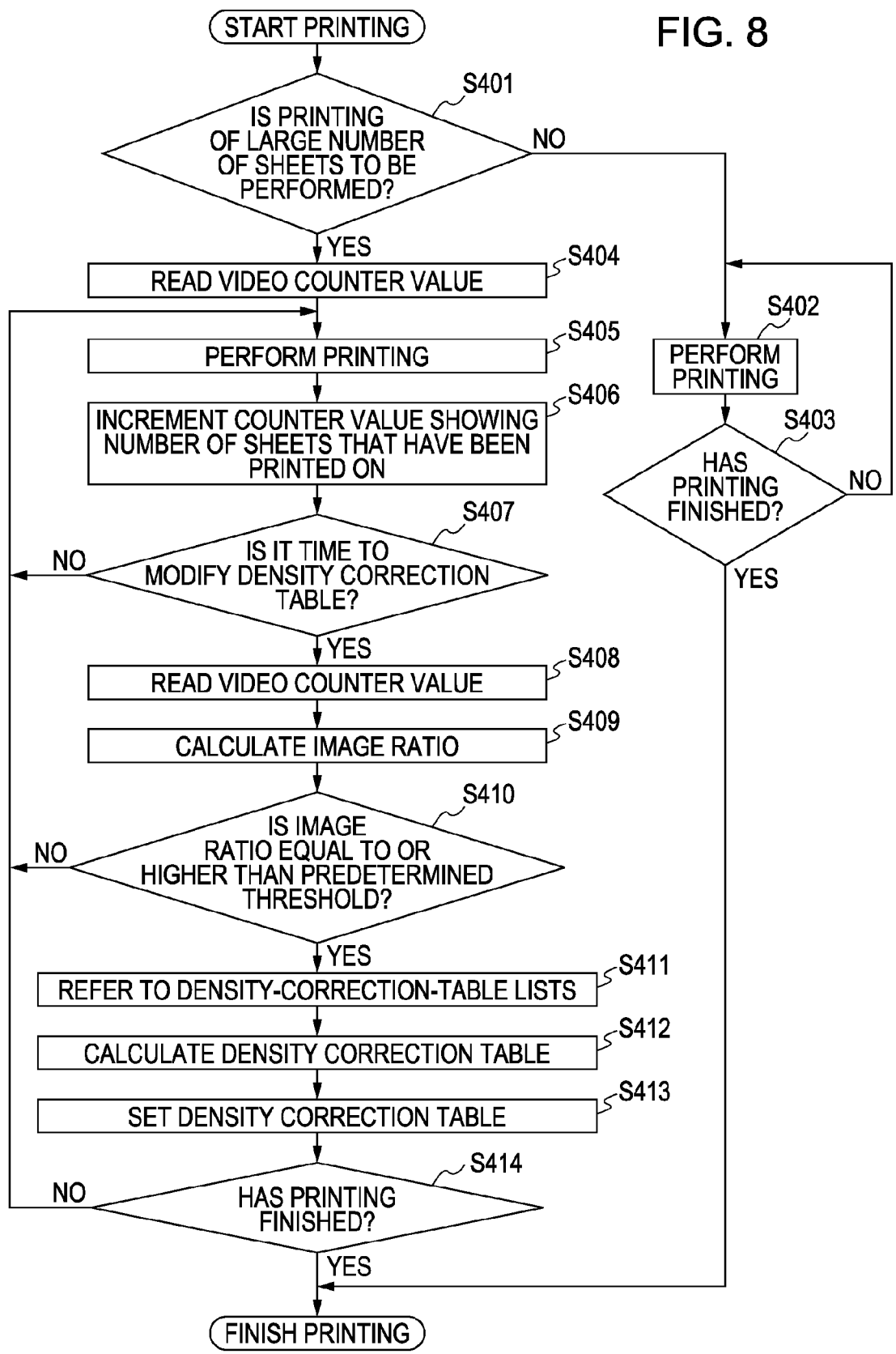
FIG. 8 is a flowchart of an embodiment of an operation flow showing a density correction method in a second embodiment.

FIG. 8 is a flowchart of an embodiment of an operation flow showing a density correction method in the second embodiment. Because, in FIG. 8, the processes of steps S401 to S409 may be exactly the same as the processes of steps S301 to S309 described in the first embodiment, the description thereof is omitted herein.

In step S409, the CPU 101 determines whether the calculated image ratio exceeds a threshold of the image ratio that is defined in advance (step S410). The threshold of the image ratio, which is defined in advance, is lower than the lower limit value of the image ratio in the density-correction-table lists 105, i.e., 20%, in the second embodiment. The reason for setting such a value is that, when a value of the image ratio that exists after a predetermined number of sheets have been printed on is low, the accuracy of the density correction process may be prevented from being decreased in a case in which the values in the density-correction-table lists 105 were referred to, and in which the density correction table 106 was reset. For example, while the lower limit value of the image ratio in the density-correction-table lists 105 is 20%, an image ratio calculated by the CPU 101 is 5%. In this case, although the calculated image ratio is 15% lower than 20%, which is the lower limit value image ratio in the density-correction-table lists 105, density shifts may be calculated by a linear interpolation operation or the like. In particular, because measurement of density values using the patch images is not performed for the lower limit value, there is a probability that density shifts for the lower limit value are not determined.

As a matter of course, when the lower limit value corresponds to a low value such as 10% or 5% in the first embodiment, the above-mentioned problem does not occur. However, in the second embodiment, the description is made below for the forgoing example, i.e., for the case in which the lower limit value of the image ratio is a comparatively high value of 20% in the density-correction-table lists 105.

In step S410, when the image ratio calculated by the CPU 101 is lower than the threshold of the image ratio that is defined in advance, the density-correction-table lists 105 may not, for example, be referred to or the density correction table 106 may not be set. In other words, no process is performed at all even at a time at which the density-correction-table lists 105 are to be referred to. Additionally, the density correction process is performed using the values that have been set in the density correction table 106 before this point also for an image data item that is to be input after this point.

Also in step S410, when it is determined that the image ratio calculated by the CPU 101 is lower than the threshold of the image ratio, which is defined in advance, the CPU 101 may change a time at which the density-correction-table lists 105 are next referred to. For example, the density-correction-table lists 105 are referred to, and the density correction table 106 is set, every time 400 sheets have been printed on. In such a case, when it is determined that the image ratio is lower than the predetermined threshold, the number of sheets to be printed on, which corresponds to a time at which the density-correction-table lists 105 are next referred to, is changed to 200 sheets, which is half the number of sheets that was previously used. In this manner, a time at which the density-correction-table lists 105 are next referred to is changed in accordance with the image ratio calculated by the CPU 101, thereby recognizing a time at which the image ratio changes by a large amount, so that the density correction process can be performed many times. In other words, the density-correction-table lists 105 can be referred to, and the density correction table 106 can be also set, at an appropriate time.

In step S410, when the image ratio calculated by the CPU 101 exceeds the threshold of the image ratio, which is defined in advance, a process of resetting the density correction table 106 is performed at a time at which the density-correction-table lists 105 are referred to, as in the case of the first embodiment. In other words, the density-correction-table lists 105 are referred to, and density shifts of the respective patch images for the calculated image ratio are read (step S411). A density correction table is calculated using the density shifts that have been read (step S412). Then, the calculated density correction table is set as the density correction table 106 (step S413). After that, the density correction process is performed for an image data item to be input via the image input I/F 104.

The image forming device according to the second embodiment appropriately performs the processes of steps S401 to S413 until performance of the density correction process for all of image data items that are input and printing of all of the image data items is completed (step S414).

As described above, in the second embodiment, when the image ratio used for printing is lower than the predetermined image ratio at a time at which the density-correction-table lists are next referred to, a process continues being performed using the density correction table that has been set without referring to the density-correction-table lists. Thus, when printing of an image having a small image ratio is performed, the density level of the image can be stabilized.

Next, a third embodiment will be described. Also in the description of the third embodiment, components common to the first or second embodiment, and the third embodiment are designated by the same reference numerals shown in the same drawings.

Figure 9:
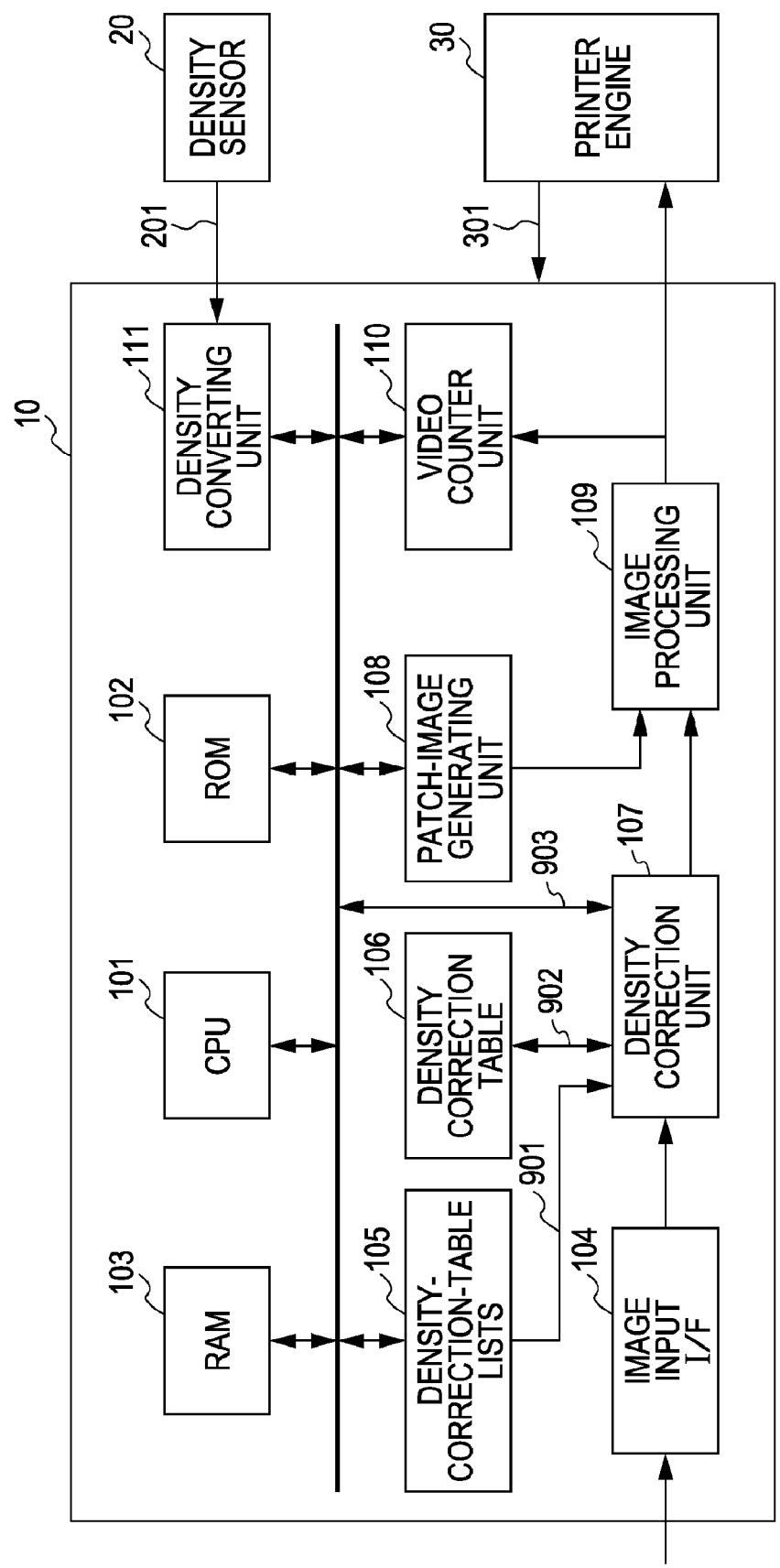
FIG. 9 a diagram of an embodiment of a configuration of an image forming device according to a third embodiment.
Figure 10A:
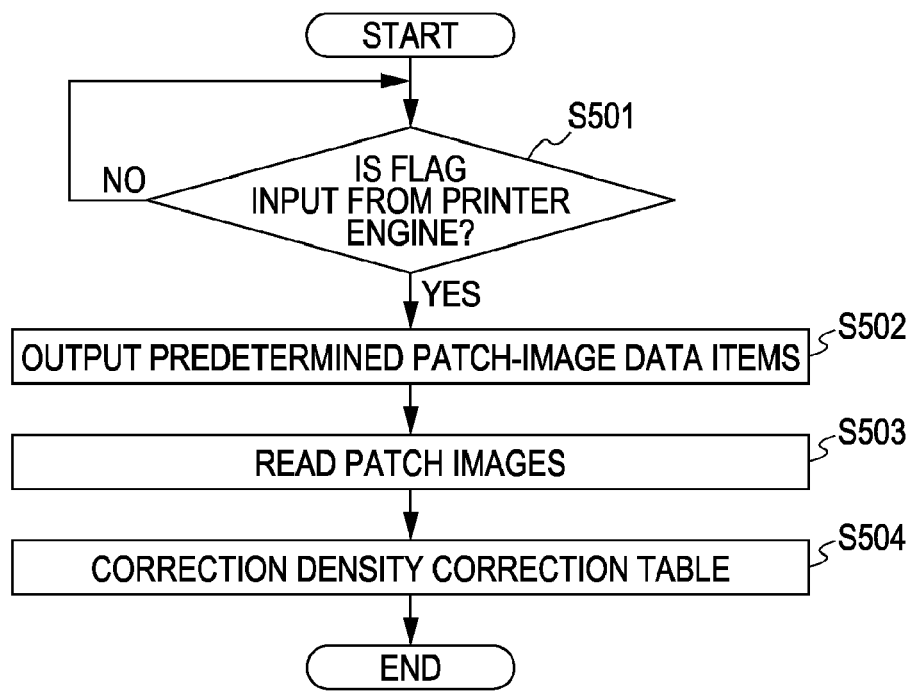
FIG. 10A is a flowchart of an embodiment of an operation flow of a calibration process.
Figure 10B:
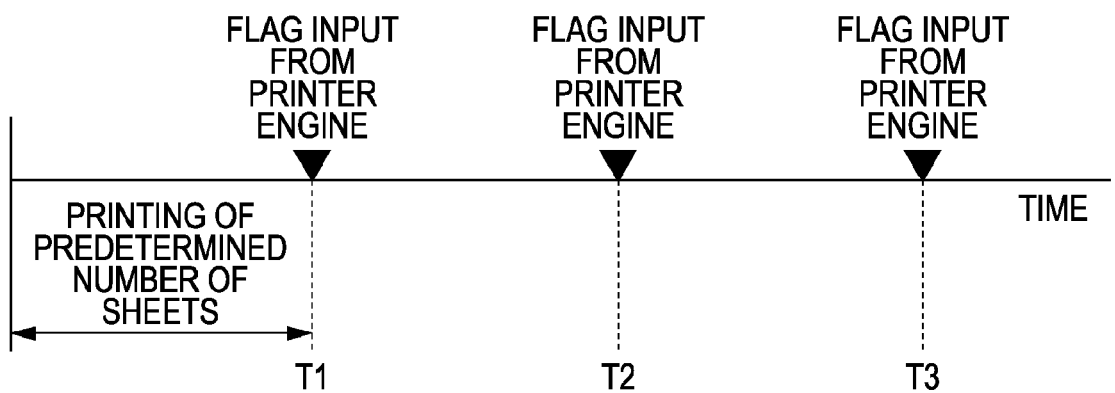
FIG. 10B shows an embodiment of times at which the calibration process is performed.

FIG. 9 is a diagram of a configuration of an image forming device according to the third embodiment of the present invention. Because, in FIG. 9, processing units denoted by the reference numerals 101 to 111 are processing units that may be the same as those described in the first embodiment, the description thereof is omitted herein.

The third embodiment differs from the first embodiment in that the density correction unit 107 is capable of referring to the values in the density-correction-table lists 105 via a path 901, and in that the density correction unit 107 is capable of setting the density correction table 106 via a path 902. Additionally, a path 903 is provided as an additional path used in the control sequence so that the CPU 101 issues an instruction to the density correction unit 107 via the path 903.

Next, an operation of the image forming device according to the third embodiment is described. In the third embodiment, a processing unit that performs steps S310 to S312 in the operation flow illustrated in FIG. 4 in the first embodiment is changed from the CPU 101 to the density correction unit 107. A process performed by the density correction unit 107 is described below in detail.

When the number of sheets that have been printed on reaches the number of sheets corresponding to a time at which the density-correction-table lists 105 are referred to, the CPU 101 calculates an image ratio used for printing. In other words, as in the cases of the first and second embodiments that have been described, the CPU 101 calculates an image ratio using the video counter value that was maintained when printing was started and the video counter value obtained when the predetermined number of sheets that have been printed on. The density correction unit 107 is notified of the calculated image ratio and the number of sheets that have been printed on via the path 903. When the density correction unit 107 receives the calculated image ratio and the number of sheets that have been printed on which are notified by the CPU 101, the density correction unit 107 refers to values for the number of sheets that have been printed on and the image ratio which are notified in the density-correction-table lists 105. Also in this case, as in the case of the first embodiment, when the image ratio that is notified does not coincide with any one of the image ratios used in the density-correction-table lists 105, the CPU 101 calculates a density shift using two density shifts for image ratios that are close to the image ratio that is notified. More specifically, when the image ratio that is notified is 25%, the density correction unit 107 calculates a density shift for the image ratio that is notified using two density shifts for the number of sheets that is notified, i.e., a density shift for an image ratio of 20% and a density shift for an image ratio of 40% for the number of sheets that is notified, in each of the density-correction-table lists 105. A calculation method in this case may be a linear interpolation method or an interpolation method using a quadratic term.

Next, the density correction unit 107 calculates a density correction table using density shifts of the respective patch images that have been read from the density-correction-table lists 105. The density correction unit 107 sets the calculated density correction table as the density correction table 106. In the description given above, the density correction unit 107 calculates a density correction table, and sets the density correction table as the density correction table 106. However, a configuration may be used, in which the above-described process can be performed only by the density correction unit 107. In other words, the density correction unit 107 may maintain the density shifts of the respective patch images that are maintained in the density-correction-table lists 105. In a case in which an image data item is input after this point, when the density correction process is performed for the image data item that is input, the density correction unit 107 may perform the above-described process while it is calculating a density correction value in real time. In this case, the density correction table 106 may not be necessary. Thus, when the density correction table 106 is configured using a static random-access memory (SRAM) or the like, the memory size can be reduced.

As described above, in the third embodiment, the CPU 101 may need only to notify the density correction unit 107 of the number of sheets that have been printed on and the image ratio calculated using the video counter values. Thus, the processing load on the CPU 101 can be reduced.

Additionally, as described in the second embodiment, when the image ratio is lower than a predetermined threshold of the image ratio that is set in advance, the CPU 101 may not notify the density correction unit 107 of the number of sheets that have been printed and the image ratio calculated by the CPU 101. Thus, this leads to simplification of control.

As described above, in the third embodiment, in response to an instruction issued by the CPU 101, the density correction unit 107 refers to the density-correction-table lists 105 and calculates a density correction value. Thus, reduction of the load on the CPU 101 can be realized. In addition, since reduction of the memory size that may be necessary for the density correction process can be achieved, reduction of the scale of the entire circuit in the image forming device can be achieved. Particularly, because of reduction of the load on the CPU 101, when a multi-function apparatus (a combination apparatus having a function of a printer) including the image forming device according to the third embodiment is configured, a CPU can be effectively used for other functions other than a printing function.

Any one of the image forming devices according to the embodiments of the present invention may be applied to a system including a plurality of apparatuses (for example, a host computer, an interface apparatus, a reader, and a printer), and may be applied to an apparatus configured as one unit (for example, a copier, a facsimile apparatus).

Furthermore, in another embodiment of the present invention, a recording medium on which a program code of software that realizes functions according to any one of the forgoing embodiments is recorded may be provided in a system or an apparatus. A computer (a CPU or a micro processing unit (MPU)) of the system or the apparatus reads and executes the program code stored on the recording medium.

In this case, the program code and computer-executable instructions that are read from the computer-readable recording medium realizes the functions according to any one of the forgoing embodiments. The recording medium that stores the program code may be provided in another embodiment of the present invention.

As the recording medium that supplies the program code, for example, a flexible disk, a hard disk, an optical disk, a magneto-optical disk, a compact disk read-only memory (CD-ROM), a compact disk recordable (CD-R), a magnetic tape, a non-volatile memory card, or a read-only memory (ROM) may be used.

Additionally, as a matter of course, the functions according to any one of the forgoing embodiments can be realized not only by executing the program code read by the computer, but also by performing processes that are described below. In other words, an operating system (OS) that operates on the computer or the like may perform a portion of or all of the accrual processes in accordance with instructions of the program code, and the functions according to any one of the forgoing embodiments can be realized by performing the processes with the OS.

Moreover, in another embodiment, the program code read from the recording medium may be written into a memory provided on a functionally expanded board that is inserted into the computer or provided in a functionally expanded unit that is connected to the computer. Then, for example, a CPU that is provided on the functionally expanded board or that is provided in the functionally expanded unit, or the like may perform a portion of or all of the accrual processes in accordance with instructions of the program code, and the functions according to any one of the forgoing embodiments can be realized by performing the processes with the CPU.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-283547 filed Oct. 31, 2007, which is hereby incorporated by reference herein in its entirety.

What is claimed is:

1. An image forming device comprising:
   at least one processor programmed to control:
   a storing unit configured to maintain density-correction-table lists generated by forming patch images which are different from one another in density on a photosensitive drum after printing data having a first image ratio on a predetermined number of sheets, reading the formed patch images by a sensor, obtaining, from density values of the read patch images, amounts of density changes that exist after printing the data having the first image ratio on the predetermined number of sheets, forming patch images which are different from one another in density on the photosensitive drum after printing data having a second image ratio on a predetermined number of sheets, reading the formed patch images by the sensor, and obtaining, from density values of the read patch images, amounts of density changes that exist after printing the data having the second image ratio on the predetermined number of sheets;
   a counter unit configured to execute a printing job to start a printing process and count up a number of printed sheets;
   a calculation unit configured to calculate, when the number of printed sheets counted by the counter unit achieves a predetermined number, an image ratio used for printing the predetermined number of sheets;
   an obtaining unit configured to obtain from the maintained density correction table lists and with reference to the amounts of density changes on the maintained density correction table lists, each amount of density changes occurred since the start of the printing job, in accordance with the calculated image ratio and the counted number of printed sheets; and
   a density correction unit configured to correct a density of image data generated from a print job which, among the printing jobs, is not yet executed, by using the obtained amounts of density changes.

2. The image forming device according to claim 1, wherein the image ratio corresponds to an amount of toner consumed in a case in which the predetermined number of sheets have been printed on.

3. The image forming device according to claim 1, wherein obtaining of the amount of density changes with the obtaining unit is performed without interrupting outputting of the image data with the output unit.

4. The image forming device according to claim 1, wherein a time at which the obtaining unit obtains the amount of density changes is a time at which printing of the predetermined number of sheets has finished.

5. The image forming device according to claim 1, wherein a time at which the obtaining unit obtains the amount of density changes is not a time prompted by a printer engine that is connected to the image forming device, but is a time provided before the time prompted by the printer engine.

6. The image forming device according to claim 1, wherein, while obtaining of the amount of density changes with the obtaining unit, a request to rewrite the density correction characteristic that is issued by a printer engine connected to the image forming device is ignored.

7. The image forming device according to claim 1, wherein, when the amount of density changes in a density level to be obtained for the image ratio that exists after the predetermined number of sheets have been printed on, and for the predetermined number of sheets that have been printed on do not exist in the density-correction-table lists, the amount of density changes in the density level that do not exist in the density-correction-table lists are calculated by the obtaining unit with an interpolation operation using values in density levels around the density level that are set in the density-correction-table lists.

8. The image forming device according to claim 1, wherein the obtaining unit is controlled so that, when the image ratio that exists after the predetermined number of sheets have been printed on is equal to or higher than an image ratio that is defined in advance, obtaining of the amount of density changes with the obtaining unit is performed, and so that, when the image ratio that exists after the predetermined number of sheets have been printed on is lower than the image ratio that is defined in advance, obtaining of the amount of density changes with the obtaining unit is not performed.

9. The image forming device according to claim 1,
   wherein, the obtaining unit is controlled so that, when the image ratio that exists after the predetermined number of sheets have been printed on is equal to or lower than an image ratio that is defined in advance, obtaining of the amount of density changes with the obtaining unit is not performed, and
   wherein a time at which the obtaining unit next obtains the amount of density changes is changed.

10. The image forming device according to claim 1, wherein a number of density-correction-table lists that are maintained corresponds to a number of environments in which the image forming device operates.

11. The image forming device according to claim 1, wherein a number of density-correction-table lists that are maintained corresponds to a plurality of amounts of toner remaining in a cartridge, the toner being supplied to the image forming device.

12. The image forming device according to claim 1, wherein the density correction unit determines a density correction characteristic using the amounts of density changes and performs density correction of the image data using the determined density correction characteristic.

13. A non-transitory computer-readable storage medium containing computer-executable instructions for controlling a computer to perform an image forming method in an image forming apparatus, the computer-readable storage medium comprising:
   computer-executable instructions for maintaining density-correction-table lists generated by forming patch images which are different from one another in density on a photosensitive drum after printing data having a first image ratio on a predetermined number of sheets, reading the formed patch images by a sensor, obtaining, from density values of the read patch images, amounts of density changes that exist after printing the data having the first image ratio on the predetermined number of sheets, forming patch images which are different from one another in density on the photosensitive drum after printing data having a second image ratio on a predetermined number of sheets, reading the formed patch images by the sensor, and obtaining, from density values of the read patch images, amounts of density changes that exist after printing the data having the second image ratio on the predetermined number of sheets;

computer-executable instructions for executing a printing job to start a printing process and counting up a number of printed sheets;

computer-executable instructions for calculating, when the number of printed sheets counted by the counter unit achieves a predetermined number, an image ratio used for printing the predetermined number of sheets;

computer-executable instructions for obtaining, from the maintained density correction table lists and with reference to the amounts of density changes on the maintained density correction table lists, each amount of density changes occurred since the start of the printing job, in accordance with the calculated image ratio and the counted number of printed sheets; and computer-executable instructions for correcting a density of image data generated from a print job which, among the printing jobs, is not yet executed, by using the obtained amounts of density changes.

14. A method comprising:

maintaining density-correction-table lists generated by forming patch images which are different from one another in density on a photosensitive drum after printing data having a first image ratio on a predetermined number of sheets, reading the formed patch images by a sensor, obtaining, from density values of the read patch images, amounts of density changes that exist after printing the data having the first image ratio on the predetermined number of sheets, forming patch images which are different from one another in density on the photosensitive drum after printing data having a second image ratio on a predetermined number of sheets, reading the formed patch images by the sensor, and obtaining, from density values of the read patch images, amounts of density changes that exist after printing the data having the second image ratio on the predetermined number of sheets;

executing a printing job to start a printing process and counting up a number of printed sheets;

calculating, when the number of printed sheets counted by the counter unit achieves a predetermined number, an image ratio used for printing the predetermined number of sheets;

obtaining, from the maintained density correction table lists and with reference to the amounts of density changes on the maintained density correction table lists, each amount of density changes occurred since the start of the printing job, in accordance with the calculated image ratio and the counted number of printed sheets; and correcting a density of image data generated from a print job which, among the printing jobs, is not yet executed, by using the obtained amounts of density changes.

* * * * *